(12) United States Patent
Fukuhara

(10) Patent No.: US 8,855,193 B2
(45) Date of Patent: Oct. 7, 2014

(54) IMAGE PROCESSING APPARATUS AND METHOD FOR CONVERTING DIVISIONAL CODE STREAMS INTO PACKETS USING HEADER INFORMATION

(75) Inventor: Takahiro Fukuhara, Kanagawa (JP)

(73) Assignee: Sony Corporation (JP)

( * ) Notice: Subject to any disclaimer, the term of this patent is extended or adjusted under 35 U.S.C. 154(b) by 383 days.

(21) Appl. No.: 12/930,536

(22) Filed: Jan. 10, 2011

(65) Prior Publication Data

US 2011/0176601 A1  Jul. 21, 2011

(30) Foreign Application Priority Data

Jan. 18, 2010 (JP) ................................ P2010-007808

(51) Int. Cl.
*H04N 11/02* (2006.01)

(52) U.S. Cl.
USPC .................................................. 375/240.01

(58) Field of Classification Search
CPC .. H04N 11/02; H04N 19/00; H04N 19/00424
USPC .................................................. 375/240.01
See application file for complete search history.

(56) References Cited

U.S. PATENT DOCUMENTS

| 7,899,259 | B2 * | 3/2011 | Ishikawa | 382/232 |
| 2005/0084132 | A1 * | 4/2005 | Wee et al. | 382/100 |
| 2005/0226252 | A1 * | 10/2005 | Tomita | 370/395.42 |
| 2007/0165935 | A1 * | 7/2007 | Deshpande et al. | 382/132 |
| 2007/0223697 | A1 * | 9/2007 | Mizuno | 380/245 |
| 2008/0317431 | A1 * | 12/2008 | Mishima et al. | 375/240.01 |
| 2012/0008644 | A1 * | 1/2012 | Kure | 370/474 |

FOREIGN PATENT DOCUMENTS

| JP | 2006067570 A | 3/2006 |
| JP | 2006-311327 A | 11/2006 |
| JP | 2008147898 A | 6/2008 |
| JP | 2009017527 A | 1/2009 |

OTHER PUBLICATIONS

Reliable D-Cinema Multicasting over Heterogeneous Networks, Micanti et al., Journal of Communications, vol. 2, No. 5, Aug. 2007, pp. 25-34.*
Stephan Wenger et al: "RTP payload format for H. 264/svc scalable video coding", Journal of Zhejiang University Science A; An International Applied Physics & Engineering Journal, Springer, Berlin, DE, vol. 7, No. 5, May 1, 2006, pp. 657-667, XP 019385025.

(Continued)

*Primary Examiner* — Jay Patel
*Assistant Examiner* — Francis G Geroleo
(74) *Attorney, Agent, or Firm* — Lerner, David, Littenberg, Krumholz & Mentlik, LLP

(57) ABSTRACT

Disclosed herein is an image processing apparatus, including, a header information production section configured to produce, regarding each of divisional code streams obtained by dividing a code stream having a structure of a progression order produced by coding image data, header information at a start and an end of the divisional code stream, the header information including a characteristic amount of an image of the image data, and a packet production section configured to convert each of the divisional code streams into a packet using the header information produced by the header information production section.

10 Claims, 27 Drawing Sheets

(56) References Cited

OTHER PUBLICATIONS

Leung S Futemma E Itakura Sony A: "Payload Format for JPEG 2000 Video: Extensions for Scalability and Main Header Recovery; rfc5372.txt" Engineering Task Force, IETF ; Standard Internet Society (ISOC) 4, Rue Des Falaises CH-1205 Geneva, Switzerland, Oct. 1, 2008, XP 015060347.

Futemma E Itakura A Leung Sony S: "RTP Payload Format for JPEG 2000 Video Streams; rfc5371.txt" Internet Engineering Task Force, IETF; Standard, Internet Society (ISOC) 4, Rue Des Falaises CH-1205 Geneva, Switzerland, Oct. 1, 2008 XP 015060346.

Paolo Micanti et al: "A packetization technique for D-Cinema contents multicasting over metropolitan wireless networks", Mobile Wimax Symposium, 2007, IEEE, PI Mar. 1, 2007, pp. 120-124, XP 031079216.

Wenger S et al: "Transport and Signaling of SVC in IP Networks", IEEE Transactions on Circuits and Systems for Video Technology, IEEE Service Center, Piscataway NJ, US, vol. 17, No. 9, Sep. 1, 2007, pp. 1164-1173 XP 011193023.

European Search Report EP 11150768, dated Apr. 4, 2011.

Office Action from Japanese Application No. 2010-007808, dated Dec. 12, 2013.

Office Action from Chinese Application No. 2011-10004531.4, dated Jun. 3, 2014.

\* cited by examiner

CODE BLOCK
(EXAMPLE) 64 × 64

IMAGE PROCESSING APPARATUS AND METHOD FOR CONVERTING DIVISIONAL CODE STREAMS INTO PACKETS USING HEADER INFORMATION

CROSS-REFERENCE TO RELATED APPLICATION

The present application claims priority from Japanese Patent Application No. JP 2010-007808 filed in the Japanese Patent Office on Jan. 18, 2010, the entire content of which is incorporated herein by reference.

BACKGROUND OF THE INVENTION

1. Field of the Invention

This invention relates to an image processing apparatus and method, and more particularly to an image processing apparatus and method by which necessary data can be obtained in response to a desired characteristic amount.

2. Description of the Related Art

JPEG 2000 (Joint Photographic Experts Group 2000) standardized by ISO (International Organization for Standardization)/IEC (International Electrotechnical Commission) in 2000 has such various characteristics that it allows encoding in high compressibility, that it is ready for both of reversible compression and irreversible compression, that it allows encoding so that the resolution or the picture quality is improved by scalability and that it allows encoding so as to enhance the error resisting property. Thus, JPEG 2000 is expected as an alternative technique of JPEG (refer to, for example, Japanese Patent Laid-Open No. 2006-311327).

In 2004, JPEG 2000 Part-1 was selected as a standard codec by the standard for digital cinema (DCI (Digital Cinema Initiatives). This made it possible to standardize the encoding methods from image pickup to image editing and image distribution of digital cinema with JPEG 2000.

Also it is studied to secondarily distribute digital cinema content encoded by JPEG 2000 in this manner to a live event or a small-scale movie theater, to provide such digital cinema content to a user of a virtual space providing service, for example, to screen such digital cinema content in a movie theater in a virtual space or to distribute such digital cinema content to a portable electronic apparatus like a portable telephone set or a notebook type personal computer.

SUMMARY OF THE INVENTION

However, original digital cinema content of high picture quality and high resolution has a great data amount and is not suitable for screening in a virtual space or to a portable electronic apparatus or the like of a lower performance.

Therefore, it seems a possible idea to prepare data whose resolution and/or picture quality are adjusted in response to a distribution destination and so forth in advance. However, the diversity in distribution method, transmission line, distribution destination and so forth tends to increase further, and it is difficult to prepare data so as to satisfy all conditions.

Thus, also it seems a possible idea to adjust the resolution or picture quality to an appropriate value upon distribution. However, operation which involves decoding or encoding of data is not easy, and it is difficult to carry out the operation in short time.

Therefore, it is desirable to provide an image processing apparatus and method by which necessary data can be obtained more readily in response to a desired characteristic amount such as resolution or picture quality.

According to an embodiment of the present invention, there is provided an image processing apparatus including header information production means for producing, regarding each of divisional code streams obtained by dividing a code stream having a structure of a progression order produced by coding image data, header information at a start and an end of the divisional code stream, the header information including a characteristic amount of an image of the image data, and packet production means for converting each of the divisional code streams into a packet using the header information produced by the header information production means.

Preferably, the image processing apparatus further includes coding means for coding the image data to produce the code stream having a structure of the progression order, the header information production means producing the header information for each of the divisional code streams obtained by dividing the code stream produced by coding the image data by the coding means.

In this instance, preferably the image processing apparatus further includes dividing means for dividing the code stream produced by coding the image data by means of the coding means for each of predetermined data lengths, the header information production means producing the header information for each of the divisional code streams obtained by dividing the code stream by means of the dividing means.

The code stream may be obtained by coding the image data using the JPEG 2000 system.

In this instance, the characteristic amount may include resolution and a layer according to the JPEG 2000 system.

In this instance, preferably the progression order has a hierarchical structure of at least two hierarchies, and a variable of the upper hierarchy is the resolution and a variable of the lower hierarchy is the layer or the variable of the upper hierarchy is the layer and the variable of the lower hierarchy is the resolution.

The header information production means may include extraction means for extracting a start address and an end address of each of the divisional code streams, characteristic amount calculation means for calculating a characteristic amount at a start and an end of each of the divisional code streams based on the progression order and the start address and the end address extracted by the address extraction means, attribute number calculation means for calculating an attribute number which is an identification number for identifying the characteristic amount from a different characteristic amount from the characteristic amount at the start and the end of each of the divisional code streams calculated by the characteristic amount calculation means, and describing means for producing the header information and describing the attribute number calculated by the attribute number calculation means into the header information.

In this instance, the attribute number calculation means may include discrimination means for discriminating the progression order, and calculation processing means for calculating the attribute number using a calculation expression for exclusive use for the progression order discriminated by the discrimination means.

According to the embodiment of the present invention, there is provided an image processing method for an image processing apparatus, including steps of, being carried out by header information production means of the image processing apparatus, of specifying, regarding each of divisional code streams obtained by dividing a code stream having a structure of a progression order produced by encoding image data, header information at a start and an end of the divisional code stream including a characteristic amount of an image of the image data, and being carried out by a packet production means of the image processing apparatus, converting each of the divisional code streams into a packet using the produced header information.

In the image processing apparatus and the image processing method for an image processing apparatus, regarding each of divisional code streams obtained by dividing a code stream having a structure of a progression order produced by encoding image data, header information at a start and an end of the divisional code stream including a characteristic amount of an image of the image data is produced. Then, each of the divisional code streams is converted into a packet using the produced header information.

According to another embodiment of the present invention, there is provided an image processing apparatus including characteristic amount specifying means for specifying a characteristic amount at a start and an end of each of divisional code streams, obtained by dividing a code stream having a structure of a progression order produced by coding image data, based on information regarding a characteristic amount of an image of the image data at a start and an end of the divisional code stream, the characteristic amount being included in a packet including the divisional code stream, and packet selection means for carrying out selection of the packet in response to a desired characteristic amount based on the characteristic amount at the start and the end of the divisional code stream specified by the characteristic amount specifying means.

The code stream may be obtained by coding the image data using the JPEG 2000 system.

In this instance, the characteristic amount may include resolution and a layer according to the JPEG 2000 system.

In this instance, preferably the progression order has a hierarchical structure of at least two hierarchies, and a variable of the upper hierarchy is the resolution and a variable of the lower hierarchy is the layer or the variable of the upper hierarchy is the layer and the variable of the lower hierarchy is the resolution.

Preferably, the packet includes an attribute number, which is an identification number for identifying the characteristic amount from a different characteristic amount, at the start and the end of the divisional code stream included in the packet, and the characteristic amount specifying means calculates the characteristic amount from the attribute number.

In this instance, the characteristic amount specifying means may include discrimination means for discriminating the progression order, and calculation processing means for calculating the characteristic amount from the attribute number using a calculation expression for exclusive use for the progression order discriminated by the discrimination means.

The packet selection means may include discrimination means for discriminating the progression order, and selection processing means for carrying out selection of the packet using a discrimination expression for exclusive use for the progression order discriminated by the discrimination means.

According to the embodiment, there is provided an image processing method for an image processing apparatus, including a step, carried out by characteristic amount specifying means of the image processing apparatus, of specifying a characteristic amount at a start and an end of each of divisional code streams, obtained by dividing a code stream having a structure of a progression order produced by coding image data, based on information regarding a characteristic amount of an image of the image data at a start and an end of the divisional code stream, the characteristic amount being included in a packet including the divisional code stream, and a step, carried out by packet selection means of the image processing apparatus, of carrying out selection of the packet in response to a desired characteristic amount based on the characteristic amount at the start and the end of the specified divisional code stream.

In the image processing apparatus and the image processing method for an image processing apparatus, a characteristic amount at a start and an end of each of divisional code streams obtained by dividing a code stream having a structure of a progression order produced by coding image data is specified based on information regarding a characteristic amount of an image of the image data at a start and an end of the divisional code stream included in a packet including the divisional code stream. Then, selection of the packet is carried out in response to a desired characteristic amount based on the characteristic amount at the start and the end of the specified divisional code stream.

Consequently, according to the present invention, an image can be processed. Particularly, necessary data can be obtained with increasing ease in response to a desired characteristic amount.

DETAILED DESCRIPTION OF THE PREFERRED EMBODIMENTS

In the following, embodiments of the present invention are described with reference to the drawings.

It is to be noted that the embodiments are described in order given below.

1. First Embodiment (content distribution system)
2. Second Embodiment (personal computer)

<1. First Embodiment>

[Configuration of the Content Distribution System]

Figure 1:
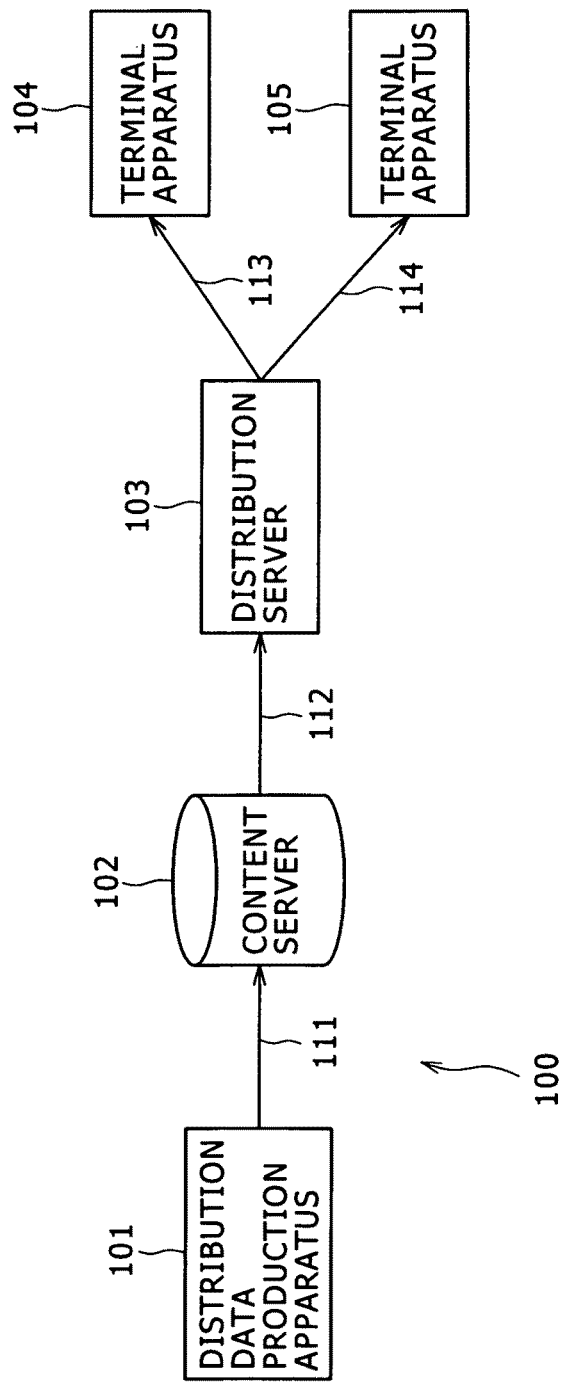
FIG. 1 is a block diagram showing an example of principal components of a content distribution system to which an embodiment of the present invention is applied.

FIG. 1 shows a configuration of a content distribution system according to a first embodiment of the present invention.

Referring first to FIG. 1, the content distribution system 100 shown distributes data of a content formed from images, sound and so forth. The content distribution system 100 adjusts a characteristic amount, for example, resolution or picture quality of an image of a content to be distributed so that it may be appropriate in accordance with various conditions such as a performance of a terminal apparatus of a destination of the distribution and then distributes the content.

The content in this instance may be, for example, a digital cinema content for digital cinema. Generally, data of a content include not only image data but also sound data and other data. However, in the following description, description is given only of image data relating to the present invention for the convenience of description.

The content distribution system 100 includes, for example, a distribution data production apparatus 101, a content server 102, a distribution server 103, a terminal apparatus 104 and another terminal apparatus 105.

The distribution data production apparatus 101 converts image data of a content produced thereby or supplied thereto from the outside into distribution data. More particularly, the distribution data production apparatus 101 converts image data into network packets which can be distributed through an IP (Internet Protocol) network such as the Internet.

The distribution data production apparatus 101 supplies network packets produced thereby to the content server 102 as indicated by an arrow mark 111 so as to be stored into the content server 102.

The content server 102 retains and manages network packets produced by the distribution data production apparatus 101 as distribution data of the content. The content server 102 supplies the network packets managed in this manner to the distribution server 103 in accordance with a request from the distribution server 103 as indicated by an arrow mark 112.

The distribution server 103 requests the content server 102 for a content requested, for example, from the terminal apparatus 104 or the terminal apparatus 105. After the distribution server 103 acquires network packets of the requested content supplied from the content server 102 based on the request, it supplies or distributes the network packets to the terminal apparatus 105 of the requesting source as indicated by an arrow mark 113 or 114.

The terminal apparatus 104 and the terminal apparatus 105 receive network packets, reproduce the content and output, that is, display an image or develop sound. Each of the terminal apparatus 104 and 105 may be an arbitrary apparatus having a communication function such as, a digital cinema playing apparatus of a movie theater, a playing apparatus of the small size set up specially on an event site or the like, a virtual playing apparatus in a virtual space, an AV apparatus installed in a general home such as a television receiver or a hard disk recorder, a portable electronic apparatus such as a portable telephone set or a notebook type personal computer, or the like.

It is to be noted that the distribution data production apparatus 101 and the content server 102, the content server 102 and the distribution server 103, and the distribution server 103, terminal apparatus 104 and terminal apparatus 105 are connected to each other by an arbitrary network including the Internet such that transfer of information is carried out through the network.

In particular, transfer of information between the apparatus indicated by arrow marks 111 to 114 is carried out through the network.

When data are to be transmitted to an IP network, it is significant what protocol should be used. While the TCP (Transmission Control Protocol) has high flexibility, since it repeats re-sending by any number of times if data are not transmitted correctly from the transmission side to the reception side, it is not suitable for a system for which real-time distribution is required.

On the other hand, a multicast protocol is suitable for data transmission of a high bit rate or transmission with low packet loss. Thus, the multicast protocol is suitable for data transmission of digital cinema of a high resolution.

However, since the multicast protocol uses the UDP (User Datagram Protocol), such data arrival reliability as is implemented by the TCP is not implemented. As measures for providing data arrival reliability to the multicast protocol, the NORM (NACK (Negative Acknowledgment) Oriented Reliable Multicast) protocol which recovers a packet by carrying out NACK (inaccessibility confirmation request) was proposed by the IETF (Internet Engineering Task Force).

The content distribution system 100 adopts this NORM protocol.

In this manner, in the content distribution system 100, the distribution server 103 acquires network packets from the content server 102 and distributes the network packets to the terminal apparatus 104 and/or the terminal apparatus 105.

In preparations for such distribution, the distribution data production apparatus 101 describes information regarding a characteristic amount of an image such as resolution or picture quality in the extended region of the NORM header and generates network packets including the NORM header.

The distribution server 103 acquires network packets including such a NORM header as described above from the content server 102. By referring to the NORM header included in the network packets, the distribution server 103 can easily grasp an image characteristic amount such as resolution or picture quality of the image data in the form of coded data included in the network packets.

Thus, the distribution server 103 selects and distributes, based on the information of the NORM header, only those network packets which have an appropriate image characteristic amount such as resolution or picture quality in regard to a performance of a terminal apparatus of the distribution destination, a distribution method, a transmission line and so forth.

In this manner, only by selecting network packets, that is, image data, in accordance with information of the NORM header, the distribution server 103 can easily distribute image data of an image characteristic amount appropriate to various conditions such as the distribution destination and so forth in this manner. In particular, the distribution server 103 can easily obtain image data of an appropriate or desired image characteristic amount in accordance with an object.

In other words, the distribution data production apparatus 101 can generate distribution data, that is, network packets, with which the distribution server 103 can easily obtain necessary image data in accordance with a desired image characteristic amount.

Or in other words, by using such a method as described above, the content distribution system 100 can suppress unnecessary increase of the data amount of distribution data or network packets to be retained in the content server 102. In other words, the content distribution system 100 can be applied to a variety of applications while increase of the cost is suppressed.

In the following, the individual components, method and so forth are described more particularly.

[Configuration of the Distribution Data Generation Apparatus]

Figure 2:
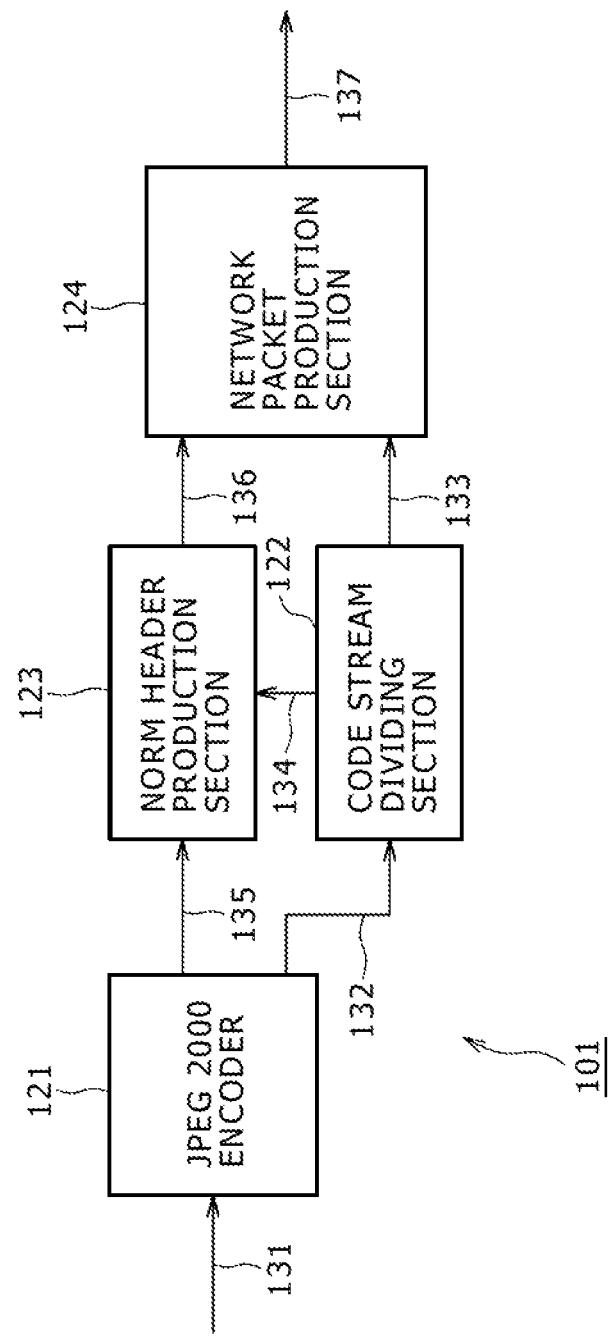
FIG. 2 is a block diagram showing an example of principal components of a distribution data generation apparatus shown in FIG. 1.

FIG. 2 shows an example of principal components of the distribution data production apparatus 101 shown in FIG. 1.

Referring to FIG. 2, the distribution data production apparatus 101 includes, a for example, a JPEG 2000 encoder 121, a code stream dividing section 122, a NORM header production section 123, and a network packet production section 124.

If image data and so forth of a baseband are supplied from the outside as indicated by an arrow mark 131, then the JPEG 2000 encoder 121 codes the image data by the JPEG 2000 method to generate a code stream. The JPEG 2000 encoder 121 supplies the generated code stream to the code stream dividing section 122 as indicated by an arrow mark 132.

The code stream dividing section 122 divides the code stream supplied thereto for each predetermined data length suitable for placement into a network packet. Usually, the data length of a code stream of JPEG 2000 is much greater than the data length of an IP packet to be transmitted to a network. Accordingly, it is basically necessary to divide the code stream generated by the JPEG 2000 encoder 121 into a plurality of packets in accordance with an JP packet length.

The code stream dividing section 122 supplies the divisional code streams obtained by dividing the code stream to the network packet production section 124 as indicated by an arrow mark 133. The code stream dividing section 122 further supplies the divisional code streams to the NORM header production section 123 as indicated by an arrow mark 134.

Further, the JPEG 2000 encoder 121 generates progression order information representative of a data configuration, which is an order of code data wherein an image characteristic amount such as resolution or a layer is used as a variable, regarding the generated code stream. Then, the JPEG 2000 encoder 121 supplies the progression order information to the NORM header production section 123 as indicated by an arrow mark 135.

The NORM header production section 123 generates a NORM header for each of the divisional code streams supplied thereto from the code stream dividing section 122. The NORM header production section 123 further specifies the image characteristic amount such as resolution or a layer of each of the divisional code streams and describes the specified information into the expansion region of the NORM header.

The NORM header production section 123 supplies the generated NORM header to the network packet production section 124 as indicated by an arrow mark 136).

The network packet production section 124 generates a header for each of the divisional code streams supplied thereto from the code stream dividing section 122 using a corresponding one of the NORM headers supplied thereto from the NORM header production section 123 to generate a network packet.

The network packet production section 124 outputs the generated network packet as indicated by an arrow mark 137 and supplies the network packet, for example, to the content server 102 so as to be accumulated into the content server 102.

[Configuration of the JPEG 2000 Encoder]

Figure 3:
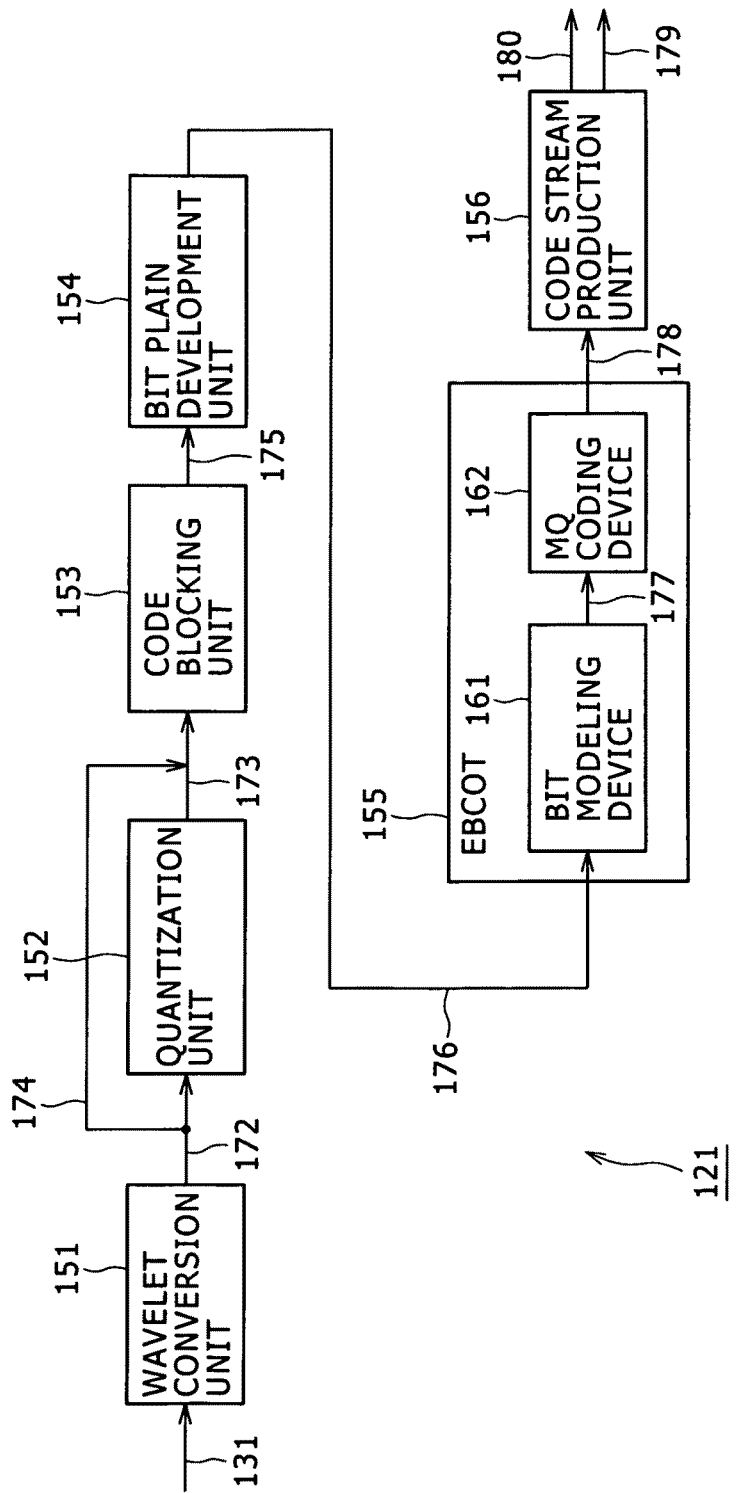
FIG. 3 is a block diagram showing an example of principal components of a JPEG 2000 encoder shown in FIG. 2.

FIG. 3 shows an example of principal components of the JPEG 2000 encoder of FIG. 2.

The JPEG 2000 encoder 121 carries out wavelet conversion of image data and develops coefficients obtained by the wavelet conversion into a bit plane for each code block and then carries out entropy encoding for each bit plane.

The JPEG 2000 encoder 121 carries out entropy encoding called EBCOT (Embedded Block Coding with Optimized Truncation) prescribed in the JPEG 2000 specification (refer to ISO/IEC 15444-1, Information technology-JPEG 2000, Part 1: Core coding system).

This entropy coding called EBCOT (Embedded Block Coding with Optimized Truncation) is a technique of arithmetically coding binary data developed in a bit plane while modeling the binary pixel in a unit of one pixel.

Referring to FIG. 3, the JPEG 2000 encoder 121 includes a wavelet conversion unit 151, a quantization unit 152, a code blocking unit 153, a bit plane development unit 154, an EBCOT 155, and a code stream production unit 156.

The wavelet conversion unit 151 is implemented by a filter bank usually configured from a low-pass filter and a high-pass filter. Further, since a digital filter usually has an impulse response or filter coefficient having a length of a plurality of taps, the wavelet conversion unit 151 has a buffer for buffering input images, with which filtering can be carried out, in advance.

The wavelet conversion unit 151 acquires an amount of inputted image data indicated by an arrow mark 131 greater than a minimum data amount necessary for filtering. The wavelet conversion unit 151 applies filtering to the acquired image data using, for example, a 5×3 wavelet conversion filter to generate wavelet coefficients. It is to be noted that the wavelet conversion unit 151 carries out filtering of separating image data into low frequency components and high frequency components for each of the vertical direction and the horizontal direction of an image.

Then, the wavelet conversion unit 151 repeats such a filtering process as described above recursively by a predetermined number of times for sub bands separated as the low frequency components in both of the vertical direction and the horizontal direction. This is because much energy of an image is concentrated on low frequency components as seen in FIG. 4.

Figure 4:
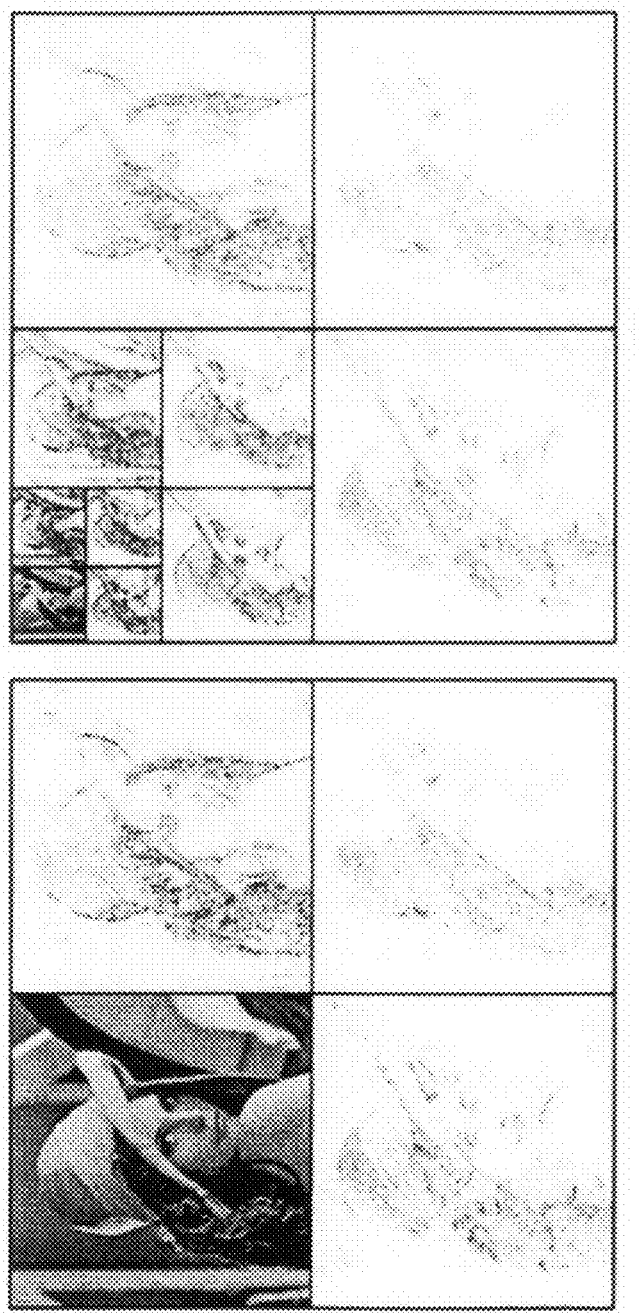
FIGS. 4 and 5 are views illustrating an example of a configuration of sub bands.

FIG. 4 illustrates an example of a configuration of sub bands. As seen in FIG. 4, not only in a state of the division level number 1 but also in a state of the division level number 3, most of energy of an image is concentrated on low frequency components.

Figure 5:
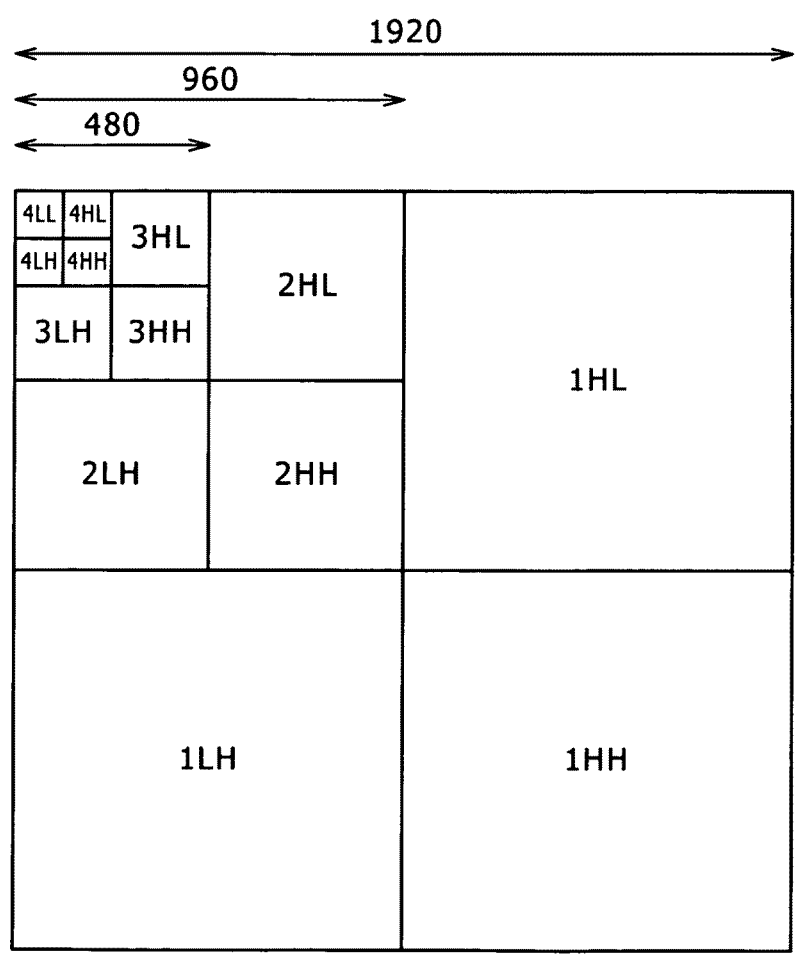

FIG. 5 illustrates an example of a configuration of sub bands generated by a wavelet conversion process of the division level number 4.

In this instance, the wavelet conversion unit 151 first carries out filtering of an entire image to produce sub bands 1LL (not shown), 1HL, 1LH and 1HH. Then, the wavelet conversion unit 151 carries out filtering again of the generated sub band 1LL to produce sub bands 2LL (not shown), 2HL, 2LH and 2HH. Further, the wavelet conversion unit 151 carries out filtering again of the generated sub band 2LL to produce sub bands 3LL, 3HL, 3LH and 3HH. Further, the wavelet conversion unit 151 carries out filtering again of the generates sub band 3LL to produce sub bands 4LL, 4HL, 4LH and 4HH.

If the analysis filtering is carried out up to the division level number 4, then 13 sub bands are produced. As seen in FIG. 5, as the division level advances by one to an upper level, the size of sub bands decreases to one half in both of the vertical direction and the horizontal direction.

In particular, if image data of a baseband of an image of 1,920 pixels in the horizontal direction are subjected to analysis filtering once, then four sub bands (1LL, 1HL, 1LH and 1HH) of 960 pixels in the horizontal direction are produced. Further, if the sub band 1LL is subjected to analysis filtering once, then four sub bands (2LL, 2HL, 2LH and 2HH) of 480 pixels in the horizontal direction are produced. Further, if the sub band 2LL is subjected to analysis filtering once, then four sub bands (3LL, 3HL, 3LH and 3HH) of 240 pixels in the horizontal direction are produced. Further, if the sub band 3LL is subjected to analysis filtering once, then four sub bands (4LL, 4HL, 4LH and 4HH) of 120 pixels in the horizontal direction are produced.

It is to be noted that the division level number of wavelet conversion can be selected arbitrarily.

Referring back to FIG. 3, the wavelet conversion unit 151 supplies the coefficient data, that is, wavelet coefficients, obtained by the filtering to the quantization unit 152 for each sub band as indicated by an arrow mark 172.

The quantization unit 152 quantizes coefficient data, that is, a wavelet coefficient, supplied thereto. The quantization unit 152 supplies coefficient data, that is, a quantization coefficient, obtained by the quantization to the code blocking unit 153 as indicated by an arrow mark 173. It is to be noted that, according to the JPEG 2000 standard, the quantization process is omitted in reversible compression. In this instance, the coefficient data, that is, a wavelet coefficient, outputted from the wavelet conversion unit 151 is supplied to the code blocking unit 153 as indicated by an arrow mark 174. In this instance, the quantization unit 152 can be omitted.

The code blocking unit 153 divides coefficient data, that is, quantized coefficient data, supplied thereto into code blocks of a rectangular shape of a predetermined size which are individually processing units of entropy coding. By the definition of the standard of JPEG 2000, the vertical and horizontal sizes of the code block are equal among all sub bands. However, it is frequently impossible to assure a code block of the same size at the opposite horizontal ends or at the upper and lower ends of an image or sub band.

Figure 6:
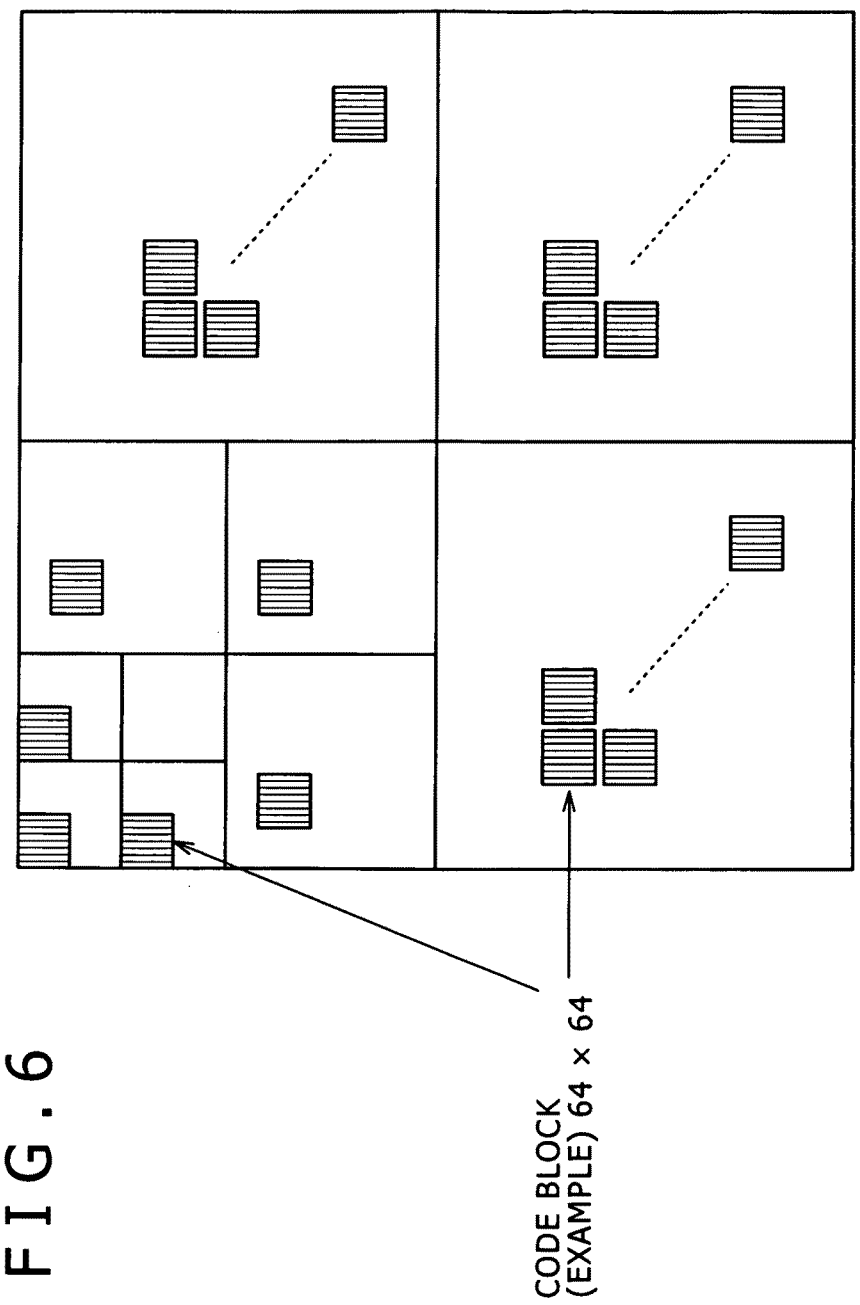
FIG. 6 is a schematic view illustrating an example of code blocks in the sub bands shown in FIGS. 4 and 5.

FIG. 6 illustrates an example of a positional relationship of code blocks in sub bands. Here, description is given of a case in which the division level number is 3. For example, a code block of a size of approximately 64×64 pixels is produced in all sub bands after division. For example, if the size of the sub band of the code block 1HH where the division level is lowest is 640×320 pixels, then totaling 50 code blocks of 64×64 pixels exist. In the processing sections at the succeeding stages, processing is carried out for each of the code blocks. Naturally, the size, that is, the pixel number, of the code blocks can be selected arbitrarily.

Referring back to FIG. 3, the code blocking unit 153 supplies the coefficient data for the individual code blocks to the bit plane development unit 154 as indicated by an arrow mark 175.

The bit plane development unit 154 develops the coefficient data for the individual code blocks supplied thereto into bit planes for the individual significances of the bits.

A bit plane is formed by dividing or slicing a coefficient group including a predetermined number of wavelet coefficients such as code blocks hereinafter described for each one bit, that is, for each significance. In other words, a bit plane is a set of bits, that is, of coefficient bits, at the same significance of a plurality of data having bit depths of a plurality of bits. Accordingly, a bit plane to be developed relies upon the bit depth of each coefficient.

Figure 7:
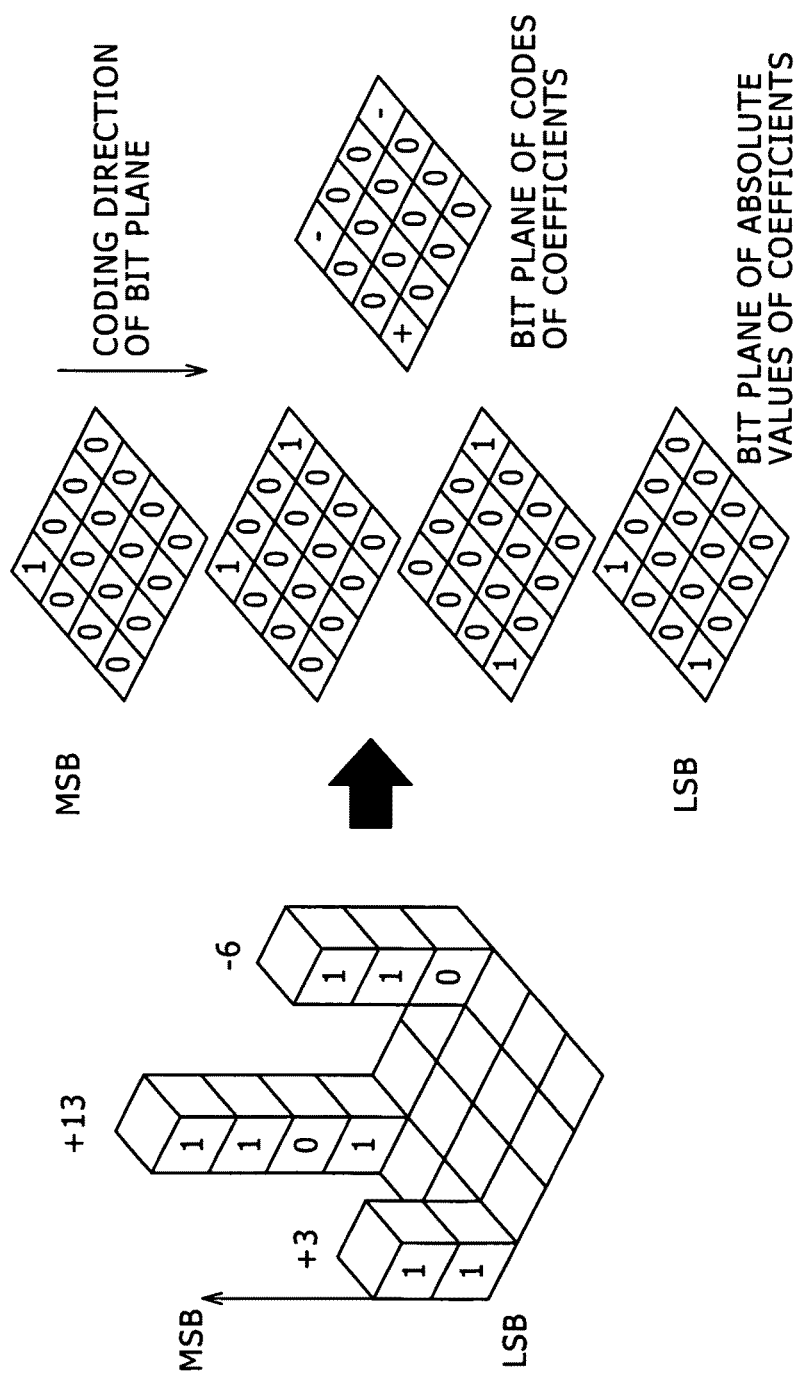
FIG. 7 is a schematic view illustrating an example of bit planes.

A particular example is illustrated in FIG. 7. A left side view of FIG. 7 shows totaling 16 coefficients including four coefficients in the vertical direction and four coefficients in the horizontal direction. Of the 16 coefficients, the coefficient 13 has a maximum absolute value and is represented as 1101 in binary number. The bit plane development unit 154 develops such a coefficient group as just described into four bit planes representative of absolute values, that is, four bit planes of absolute values, and one bit plane representative of codes, that is, a bit plane of codes. In other words, the coefficient group shown in a left portion of FIG. 7 is developed into four bit plates of absolute values and one bit plane of codes as shown in a right portion of FIG. 7. Here, the elements of the bit planes of absolute values all assume one of the values of 0 and 1. Meanwhile, the elements of the bit plane which indicate codes all assume one of a value representing that the value of the coefficient is in the positive, another value representing that the value of coefficients is 0 and a further value representing that the value of coefficients is in the negative.

It is to be noted that the number of coefficients of the coefficient group to be converted into bit planes in this manner may be selected arbitrarily. In the following description, it is assumed that, in order to facilitate processing by associated processing sections by standardizing the processing unit, the bit plane development unit 154 develops coefficients into a bit plane for each code block.

Referring back to FIG. 3, the bit plane development unit 154 supplies bit planes developed in this manner to the EBCOT 155 in an order from the most significant bit (MSB) to the least significant bit (LSB) of the coefficients. In short, the bit plane development unit 154 supplies the developed bit planes to the EBCOT 155 in the order from the higher order side toward the lower order side of the bit depth as indicated by an arrow mark 176.

The EBCOT 155 carries out coding for each block of a predetermined size while measuring a statistic of the coefficients in the block. The EBCOT 155 entropy codes coefficient data, that is, quantization coefficients, in a unit of a code block. The individual code blocks are coded in a direction from the most significant bit (MSB) toward the least significant bit (LSB) independently for each bit plane. Each of the vertical and horizontal sizes of the code blocks is a power of 2 ranging from 4 to 256, and those sizes which are used normally are 32×32, 64×64, 128×32 and so forth. It is assumed that a quantization coefficient value is represented by a binary number with a sign of n bits and bit 0 to bit n−1 individually represent bits from the LSB to the MSB. The remaining one bit is a sign. Coding of a code block is carried out by the following three coding passes in order from the bit plane on the MSB side:

(1) Significant Propagation Pass
(2) Magnitude Refinement Pass
(3) Cleanup Pass

Figure 8:
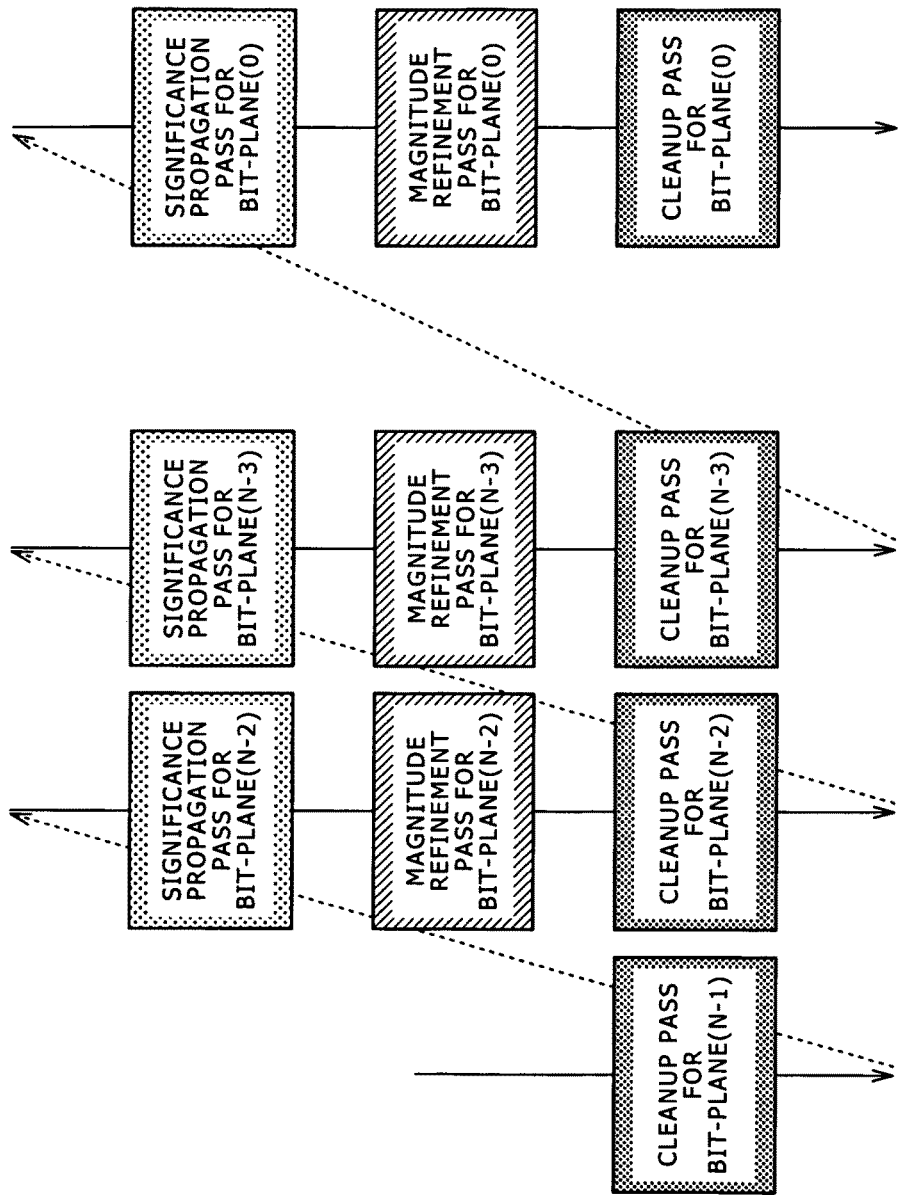
FIG. 8 is a diagrammatic view illustrating an example of coding passes.

The order in which the three coding passes are used is illustrated in FIG. 8. Referring to FIG. 8, the Bit-plane (n−1) (MSB) is coded by the Cleanup Pass. Then, the pit plane for which coding is carried out successively advances toward the LSB side, and coding of each bit plane is carried out using the three coding passes in the order of the Significant Propagation Pass, Magnitude Refinement Pass and Cleanup Pass.

Actually, however, it is written in the header at what numbered bit plane from the MSB side the value 1 appears first, and those bit planes, in which all data are zero, appearing successively from the MSB side (such a bit plane is called zero-bit plane) are not coded. In this order, the three different coding passes are repetitively used in this order to carry out coding, and the coding is stopped at an arbitrary coding pass of an arbitrary bit plane to take tradeoff of the code amount and the picture quality, that is, to carry out rate control.

Figure 9:
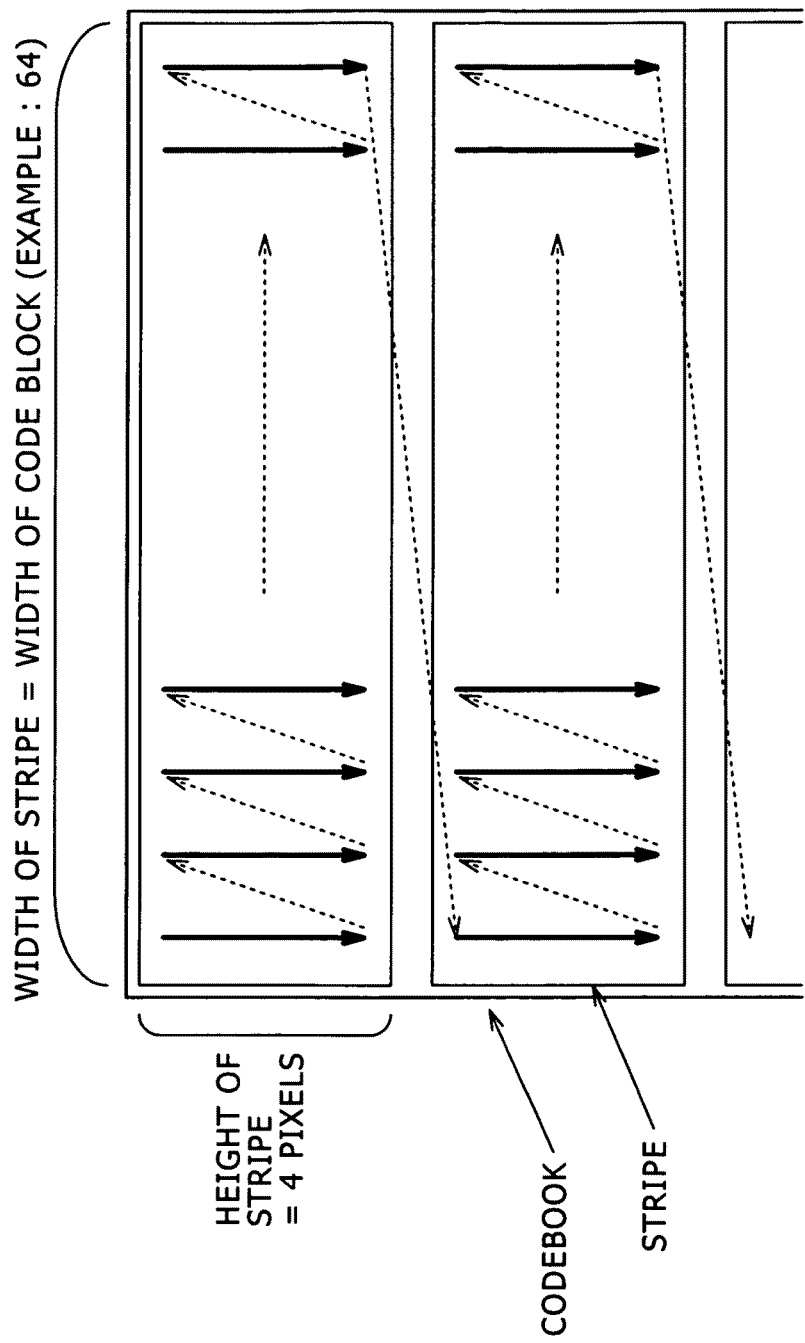
FIG. 9 is a diagrammatic view illustrating an example of scanning of coefficients.

Now, scanning of coefficients is described with reference to FIG. 9. A code block is divided into stripes for each four coefficients of the height. The width of each stripe is equal to the width of the code block. The scanning order is an order of traversing all coefficients in one code block, and within the code block, the stripes are scanned in order from the uppermost stripe toward the lowermost stripe. Further, in each stripe, the columns are scanned in order from the leftmost column toward the rightmost column, and in each column, the coefficients are scanned in order from the uppermost coefficient toward the lowermost coefficient. In the coding passes, all coefficients in the code block are processed in this scanning order.

In the following, the three coding passes are described. The following description is all described in the JPEG-2000 specification (reference document: ISO/IEC 15444-1, Information technology-JPEG 2000, Part 1: Core coding system).

(1) Significance Propagation Pass (SP Path)

In the Significance Propagation Pass wherein a certain bit plane is coded, the value of a bit plane of a non-significant coefficient around which at least one of eight neighboring coefficients is significant is arithmetically coded. Where the coded value of the bit train is 1, whether the sign is + or − is MQ coded subsequently.

Here, the term significance which is unique to JPEG 2000 is described. The significance represents a state which a coder has for each coefficient, and the initial value of the significance is 0 which represents non-significant. Then, when 1 is coded with the coefficient in this state, the significance changes to 1 which represents significant, and thereafter, the significance continues to be 1. Accordingly, it is considered that the significance is a flag representing whether or not information of an effective figure has already been coded. If the significance changes to significant on a certain bit plane, then it remains significant on all succeeding bit planes.

(2) Magnitude Refinement Pass (MR Pass)

In the Magnitude Refinement Pass wherein a bit plane is coded, the value of a bit plane of significant coefficients which are significant in the Significance Propagation Pass which codes the bit plane and are not coded is MQ coded.

(3) Cleanup Pass (CU pass)

In the Cleanup Pass wherein a bit plane is coded, the value of a bit plane of non-significant coefficients which are non-significant in the Significance Propagation Pass which codes the bit plane and which are not coded is MQ coded. Where the coded value of the bit plane is 1, whether the sign is + or −, that is, Sign information, is MQ coded subsequently It is to be noted that, in the MQ coding in the three coding paths described above, ZC (Zero Coding), RLC (Run-Length Coding), SC (Sign Coding) and MR (Magnitude Refinement) are selectively used in response to a case. Here, arithmetic coding called MQ coding is used. MQ coding is binary arithmetic coding of the learning type prescribed in JBIG2 (reference document: ISO/ICE FDIS 14492, "Lossy/Lossless Coding of Bi-level Images," March 2000).

Referring back to FIG. 3, the EBCOT 155 includes a bit modeling device 161 configured to carry out bit modeling, and an MQ coding device 162 configured to carry out arithmetic coding. After the bit modeling device 161 carries out bit modeling, it supplies control information, symbols and information of the context and so forth to the MQ coding device 162 as indicated by an arrow mark 177. The MQ coding device 162 carries out MQ coding using a data group supplied thereto. The MQ coding device 162 supplies coded data produced by the MQ coding to the code stream production unit 156 as indicated by an arrow mark 178.

The code stream production unit 156 aligns coded data supplied thereto from the EBCOT 155, particularly from the MQ coding device 162, and outputs the aligned data as a single code stream as indicated by an arrow mark 179. More particularly, the code stream production unit 156 re-arranges the coded data to produce a code stream formed from a packet group of a structure with which the Resolution and the Layer are scalable, which is a characteristic of JPEG 2000. As described hereinabove with reference to FIG. 2, the code stream outputted from the code stream production unit 156 is supplied to the code stream dividing section 122.

It is to be noted that the code stream production unit 156 further supplies progression order information representative of a structure of the produced code stream to the NORM header production section 123 as indicated by an arrow mark 180.

[Example of the Configuration of the NORM Header Production Section]

Now, the NORM header production section 123 shown in FIG. 2 is described. As described hereinabove, a code stream produced by the JPEG 2000 encoder 121 is divided by the code stream dividing section 122 and supplied as a plurality of divisional code streams to the NORM header production section 123. Meanwhile, to the NORM header production section 123, progression order information is supplied from the JPEG 2000 encoder 121.

Figure 10:
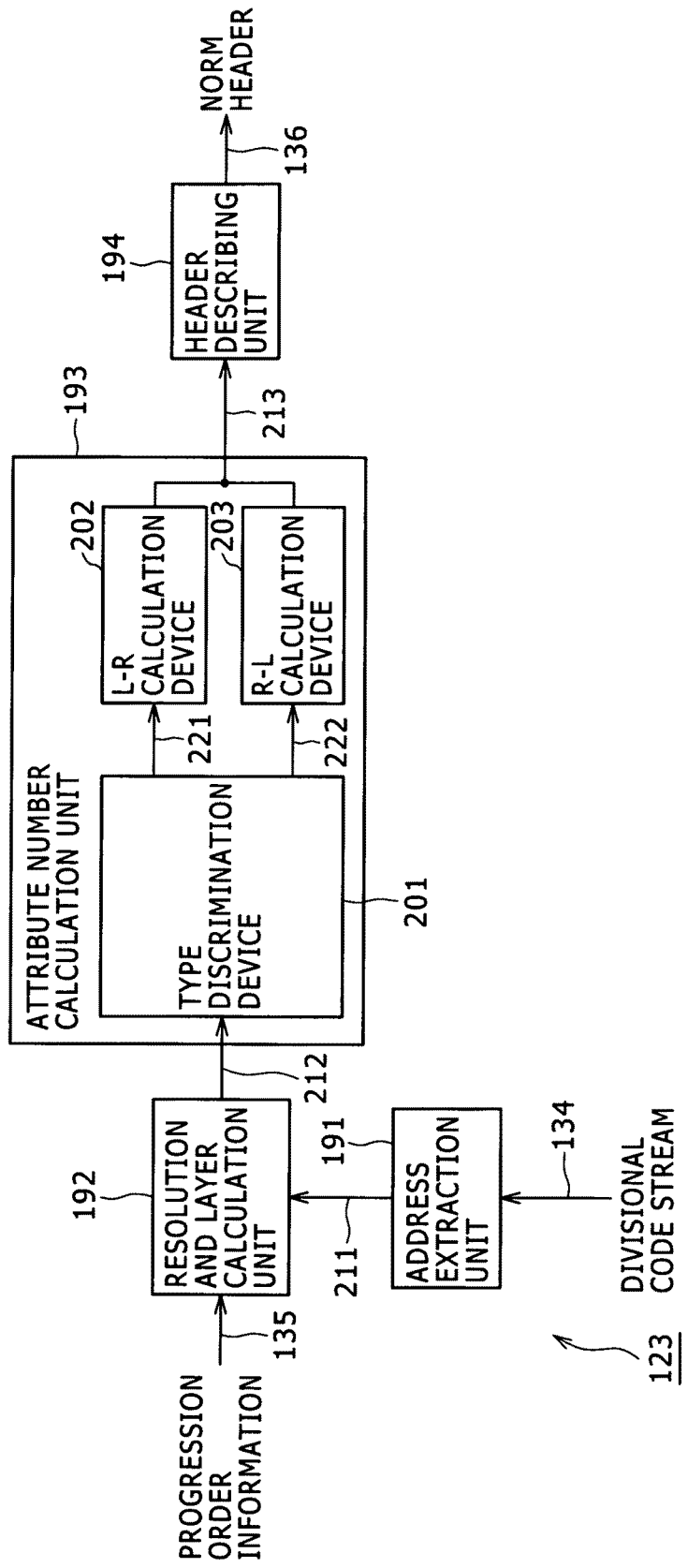
FIG. 10 is a block diagram showing an example of principal components of a NORM header production section shown in FIG. 2.

FIG. 10 shows an example of principal components of the NORM header production section 123 shown in FIG. 2.

Referring to FIG. 10, the NORM header production section 123 includes an address extraction unit 191, a resolution and layer calculation unit 192, an attribute number calculation unit 193 and a header describing unit 194.

The address extraction unit 191 extracts an address of the start, that is, a start address, and an address of the end, that is, an end address, of each of divisional code streams supplied thereto from the code stream dividing section 122 as indicated by an arrow mark 134. The address extraction unit 191 supplies the extracted start addresses and end addresses of the divisional code streams to the resolution and layer calculation unit 192 as indicated by an arrow mark 211.

The resolution and layer calculation unit 192 calculates, based on the structure of the code stream indicated by the progression order information supplied from the JPEG 2000 encoder 121, resolution and a layer which are image characteristic amounts, which become variables regarding the progression, for each of the start addresses and the end addresses supplied from the address extraction unit 191.

[Layer]

Here, the layer is described. As described hereinabove, image data are developed into a bit plane and coded for each code block. In other words, the coding passes in each code block are arranged in the order of bit planes. The layer is obtained by dividing data coded for each code block in this manner for each one bit plane or for each plural bit planes. Therefore, each layer is formed from one or a plurality of bit planes. In other words, data coded for each code block are developed over one or a plurality of layers in a code stream.

The coding pass number in a layer can be set for each block. Also it is possible to set the coding pass number to 0.

Generally, the picture quality of image data is enhanced as the layer number increases. In other words, the picture quality of image data can be adjusted by decreasing or increasing the number of divisional layers.

Figure 11:
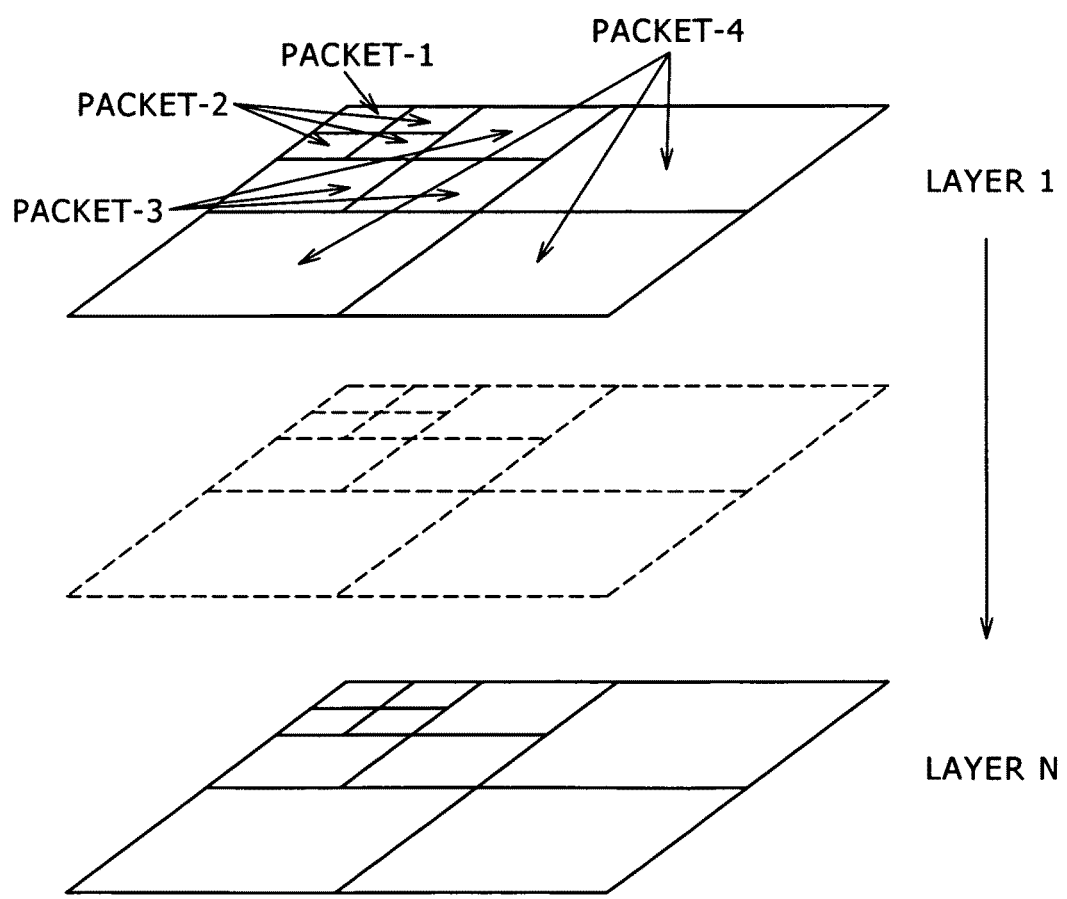
FIG. 11 is a diagrammatic view illustrating layers.

In an example illustrated in FIG. 11, one picture is divided into N layers from layer 1 to layer N, and one layer is configured from four packets. This packet number per one layer is defined by "wavelet decomposition level number+1."

As described above, a code stream is scalably coded with regard to the layer, that is, the picture quality. Further, as described hereinabove with reference FIG. 5, image data are divided into a plurality of sub bands and coded for each of the sub bands. Accordingly, a code stream is scalably coded also with regard to the resolution. In other words, in a code stream coded in accordance with the JPEG 2000 method, coded data are packed for each predetermined unit and arranged such that they are scalable with regard to the resolution and the layer.

A row of such coded data or packets as described above is called progression. In the case of the JPEG 2000 method, coded data are arranged in regard to the resolution and the layer. Accordingly, the resolution and the layer, which are image characteristic amounts, in this instance are called variables regarding the progression.

In the JPEG 2000 method, two difference arrangement methods are available for coded data.

[Type]

Figure 12:
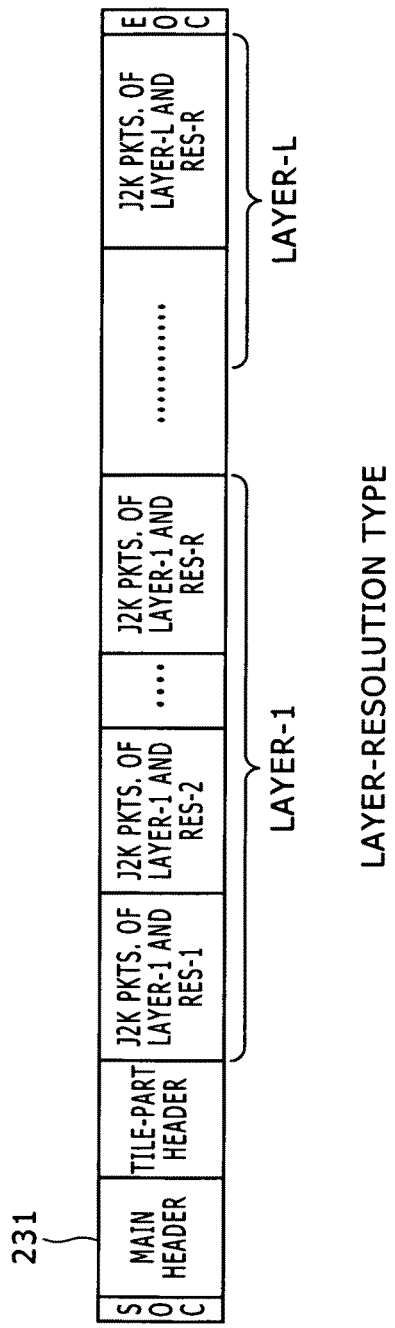
FIG. 12 is a diagrammatic view illustrating an example of a configuration of a code stream of the L-R type.

The first arrangement method is a method which arranges coded data of layers for each resolution. The type of a code stream for which such an arrangement method as just described is adopted is referred to as L-R type (Layer-Resolution Type). FIG. 12 illustrates an example of a configuration of a code stream of the L-R type.

As seen in FIG. 12, the code stream 231 includes an SOC (Start of Codestream), a Main header and a Tile-part header arranged in this order and followed by coded data of the individual layers arranged in order of the resolution. It is to be noted that L and R in FIG. 12 are arbitrary natural numbers.

Figure 13:
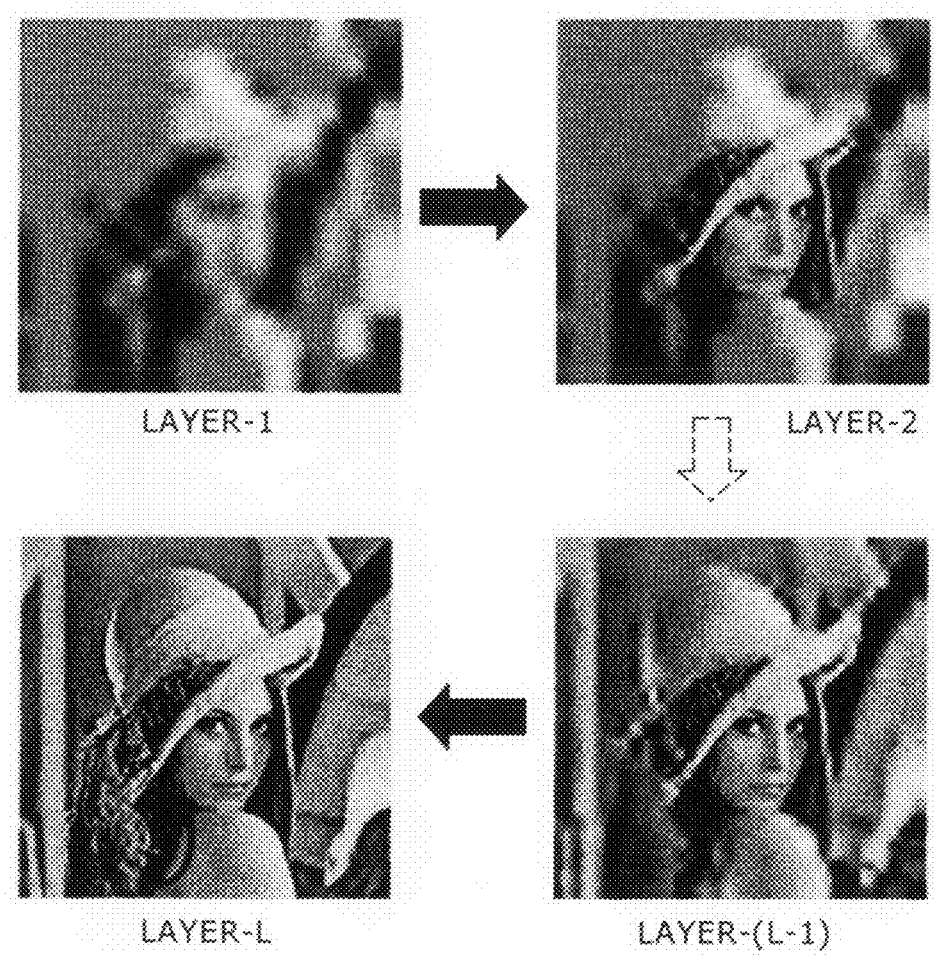
FIG. 13 is a schematic view illustrating an example of a manner of restoration of a decoded image of the L-R type.

In short, the L-R type includes the Layer in the first high hierarchical layer and the Resolution in the succeeding layer. Accordingly, if this code stream is decoded in order beginning with the start thereof, then such an image as shown in FIG. 13 can be restored.

More particularly, the Layer-1 includes packets of all resolutions from the Resolution number 1 to the Resolution number R, and by decoding this Layer-1, the first layer of an image of resolution same as that of the original image can be restored. Similarly, if the Layer-2 is decoded and a resulting image is adjusted to the decoded image of the Layer-1, then the picture quality is improved. By repetitively executing this up to the last layer-L, a final decoded image is outputted.

In short, by improving the layers to be restored in this manner, the picture quality of an image is improved while the resolution remains fixed. While, in a broad sense, the "picture quality" indicates various events, an event which relies upon a layer to be restored is hereinafter referred to as "picture quality."

The "resolution" and the "picture quality" of an image are characteristic amounts of the image. The "resolution" and the "layer" in a code stream are variables corresponding to the characteristic amounts. Accordingly, in the following description, the "resolution" and the "layer" in a code stream are regarded as equivalent to the "resolution" and the "picture quality" of an image and are sometimes referred to as "characteristic amounts of the (an) image."

Figure 14:
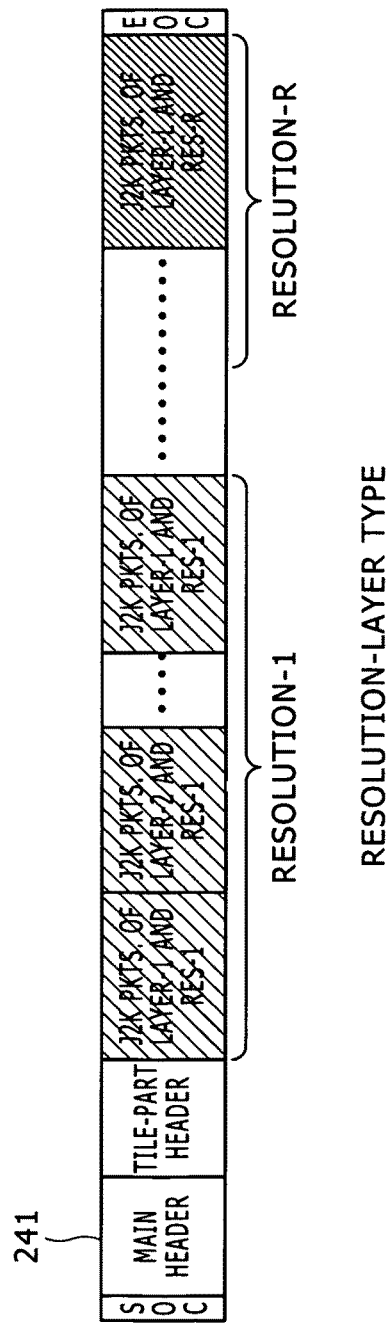
FIG. 14 is a diagrammatic view illustrating an example of a configuration of a code stream of the R-L type.

The second arrangement method is a method of arranging coded data of resolutions for each layer. The type of a code stream for which such an arrangement method as just described is adopted is referred to as R-L type (Resolution-Layer Type). FIG. 14 illustrates an example of a configuration of a code stream of the R-L type.

As seen in FIG. 14, the code stream 241 includes an SOC (Start of Codestream), a Main header and a Tile-part header arranged in this order and followed by coded data of the resolutions arranged in order of the layer. It is to be noted that L and R in FIG. 14 are arbitrary natural numbers.

Figure 15:
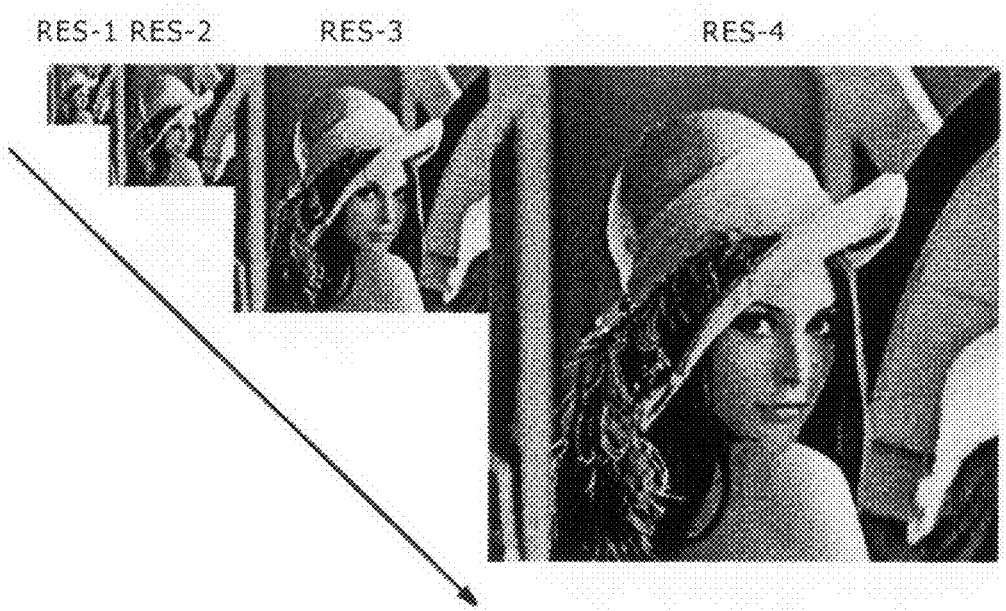
FIG. 15 is a schematic view illustrating an example of a manner of restoration of a decoded image of the R-L type.

In short, the R-L type includes the Resolution in the first high hierarchical layer and the Layer in the succeeding layer. Accordingly, if this code stream is decoded in order beginning with the start thereof, then such an image as shown in FIG. 15 can be restored. In FIG. 15, the image where the decomposition number upon the wavelet decomposition is 3 and R=4 is illustrated.

More particularly, the Res-1 includes packets of all layers from the Layer number 1 to the Layer number L, and by decoding this Res-1, the lowest resolution of an image of the highest picture quality can be restored. Similarly, by decoding the Res-2 and adjusting a resulting image to the decoded image of the Res-1, the resolution is improved to twice in both of the horizontal and vertical directions. By repetitively executing this up to the last Res-R, a final decoded image is outputted.

The resolution and layer calculation unit 192 specifies the type of a code stream from progression order information. Since the resolution and the structure of layers of the code stream can be found from the specified type, the resolution and layer calculation unit 192 can determine the resolution and the layer corresponding to each of the start and end addresses.

[L-R Type]

Figure 16:
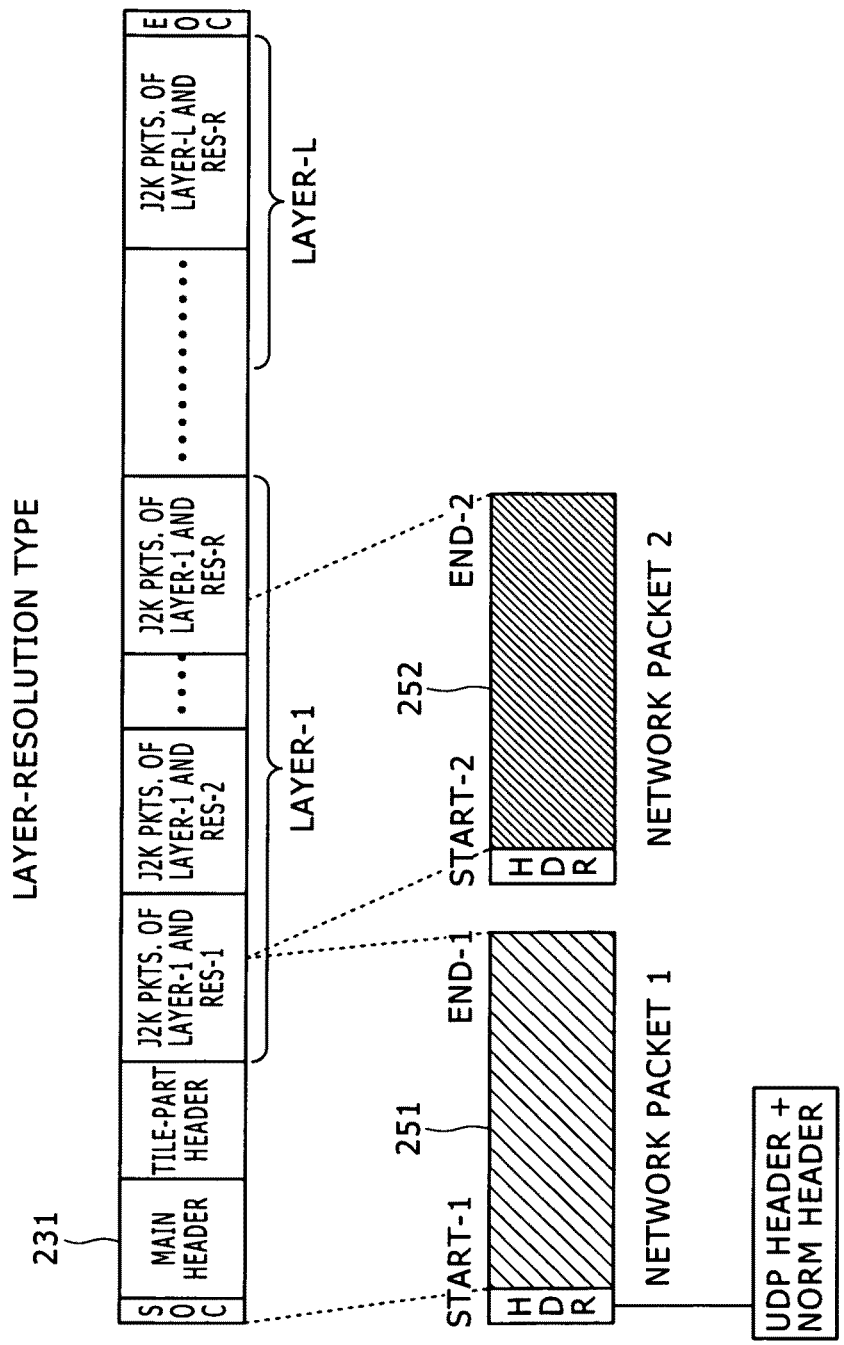
FIG. 16 is a diagrammatic view illustrating an example of a manner of production of a network packet of the L-R type.

First, processing where a code stream is of the L-R type is described. FIG. 16 illustrates an example of a manner of production of a network packet of the L-R type.

Referring to FIG. 16, it is assumed that the code stream 231 of the L-R type is divided by the code stream dividing section 122 to produce a divisional code stream 251 and another divisional code stream 252.

The divisional code stream 251 makes the Body, that is, the body data part, of a first network packet, that is, the Network Packet 1. The divisional code stream 252 makes the Body, that is, the body data part, of a second network packet, that is, the Network Packet 2.

Although naturally third and succeeding network packets are produced, they are omitted here for the convenience of description.

The address extraction unit 191 of the NORM header production section 123 determines the start address Start-1 and the end address End-1 of the divisional code stream 251. Further, the address extraction unit 191 determines the start address Start-2 and the end address End-2 of the divisional code stream 252.

Thereupon, the start address Start-1 of the divisional code stream 251 is equal to the start address of the SOC marker of the original code stream 231, and the end address End-1 of the divisional code stream 251 is equal to an intermediate address of the packet of the layer 1 and the resolution 1, that is, Layer-1 and Res-1.

Similarly, the start address Start-2 of the divisional code stream 252 is equal to the address immediately following the end address End-1 of the divisional code stream 251, and the end address End-2 of the divisional code stream 252 is equal to an intermediate address of the packet of the layer 1 and the resolution R, that is, Layer-1 and Res-R.

The progression order information represents such a structure of a code beam as illustrated on the top stage of FIG. 16, that is, from what header and packets the code stream from a specified address to another specified address is formed.

If the resolution and layer calculation unit 192 confirms from the progression order information that the code stream is of the L-R type, then it determines, based on the structure, the layer number and the resolution number corresponding to the start address and the end address of each of divisional code streams as described hereinabove.

The resolution and layer calculation unit 192 defines $(R\_f, R\_t)$=(start value of Resolution number, end value of Resolution number)

$(L\_f, L\_t)$=(start value of Layer number, end value of Layer number)

and determines values of them regarding each divisional code stream, that is, regarding each network packet.

For example, in the case of the divisional code stream 251 of the Network Packet 1 in the example of FIG. 16, the variables $(R\_f, R\_t)$ and $(L\_f, L\_t)$ described above come to have the following values:

$\_f, R\_t)=(0,1)$ $\_f, L\_t)=(0,1)$

Meanwhile, in the case of the divisional code stream 252 of the Network Packet 2, the variables $(R\_f, R\_t)$ and $(L\_f, L\_t)$ described above come to have the following values:

$\_f, R\_t)=(1,R)$ $\_f, L\_t)=(1,1)$

It is to be noted that the header HDR of each of the network packets illustrated in FIG. 16 is a combination of a UDP header and a NORM header. Since the UDP is different from the TCP in that it does not involve transmission confirmation and so forth, the data ratio is higher. Accordingly, the UDP is used frequently for streaming of images and so forth with which it does not become a significant problem even if some data are lost intermediately.

Referring back to FIG. 10, after the resolution and layer calculation unit 192 calculates the values of the variables $(R\_f, R\_t)$ and $(L\_f, L\_t)$ described hereinabove, it supplies the values to the attribute number calculation unit 193 as indicated by an arrow mark 212. The attribute number calculation unit 193 uses the values of the variables $(R\_f, R\_t)$ and $(L\_f, L\_t)$ to calculate, for each of the start and the end of each divisional code stream or each network packet, an attribute number which is an identification number for the identification of the image characteristic amounts, that is, the resolution and the layer.

As seen in FIG. 10, the attribute number calculation unit 193 includes a type discrimination device 201, an L-R calculation device 202 and an R-L calculation device 203.

The type discrimination device 201 discriminates the type of the code stream based on the progression order information supplied thereto from the resolution and layer calculation unit 192. If the type of the code stream is the L-R type, then the type discrimination device 201 supplies the values of the variables $(R\_f, R\_t)$ and $(L\_f, L\_t)$ of each divisional code stream supplied thereto from the resolution and layer calculation unit 192 to the L-R calculation device 202 as indicated by an arrow mark 221.

The L-R calculation device 202 determines, for each of the divisional code streams, attribute numbers of the start and the end, that is, the start value and the end value, from the values of the variables $(R\_f, R\_t)$ and $(L\_f, L\_t)$ using a calculation expression for the L-R given as an expression (1) below:

Attribute Number=(Layer-number)×(Resolution level number)+(Resolution-number+1)     (1)

It is to be noted that the Layer-number indicates the layer number, and the Resolution level number indicates a maximum value of the resolution number, that is, the divisional level number of wavelet conversion while the Resolution-number indicates the resolution number.

For example, if the Resolution level number R is set to R=4 in the example of FIG. 16, then the start value and the end value of the attribute number of the divisional code stream 251 become such as given below:

Start value=$L\_f \times (Res-R)+R\_f+1=0\times4+0+1=1$

End value=$L\_t \times (Res-R)+R\_t+1=1\times4+1+1=6$

Meanwhile, the start value and the end value of the attribute number of the divisional code stream 252 become such as given below:

Start value=$L\_f \times (Res-R)+R\_f+1=1\times4+1+1=6$

End value=$L\_t \times (Res-R)+R\_t+1=1\times4+4+1=9$

The L-R calculation device 202 determines the start value and the end value of the attribute number with regard to all divisional code streams whose variables $(R\_f, R\_t)$ and $(L\_f, L\_t)$ are supplied thereto as described above. The L-R calculation device 202 supplies the determined start values and end values of the attribute numbers to the header describing unit 194 as indicated by an arrow mark 213.

The header describing unit 194 produces a NORM header for each of the divisional code streams of the start values and the end values of the attribute numbers supplied thereto from the L-R calculation device 202 and describes the start value and the end value of the attribute number into the extended parameter region of the NORM header.

[Configuration of the NORM Header]

Figure 17:
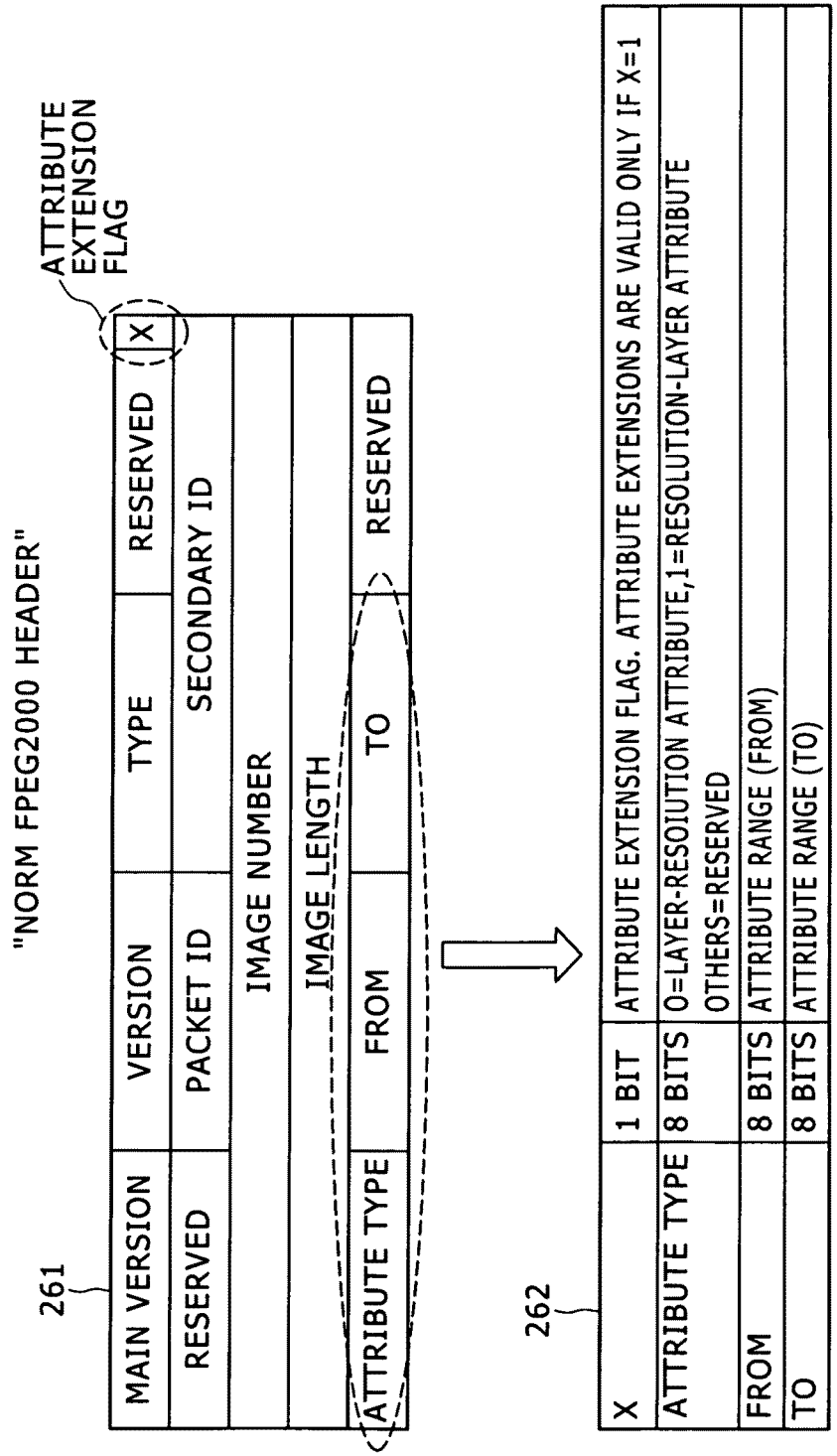
FIG. 17 is a diagrammatic view illustrating an example of a configuration of a NORM header.

FIG. 17 illustrates an example of a configuration of the NORM header.

The header describing unit 194 produces a NORM header 261 of such a configuration as seen in FIG. 17 and describes the values of X, Attribute type, FROM, TO ad so forth into the extended parameter region, that is, into the reserved region.

The substance of the variables is indicated in Table 262 of FIG. 17. X represents an attribute extension flag indicative of whether or not an attribute number is described in the NORM header 261. Although the attribute extension flag may have an arbitrary data length, the data length thereof may be, for example, 1 bit. Further, although the attribute extension flag may have an arbitrary value, for example, the value of the attribute extension flag X where a value of an attribute number is described in the NORM header 261 may be "1" while the value of the attribute extension flag X where a value of an attribute number is not described in the NORM header 261 may be "0."

The Attribute type indicates a type of a code stream described hereinabove. While the attribute type may have an arbitrary data length, the data length thereof may be, for example, 8 bits. Further, although the attribute type may have an arbitrary value, for example, the value of the attribute type where the code stream is of the L-R type may be "0" while the value of the attribute type where the code stream is of the R-L type may be "1." Further, where a type different from the L-R type and the R-L type is available, it is possible to apply a different value.

The FROM indicates the start value of the attribute number. The TO indicates the end value of the attribute number. Although the values may have any data length, the data length thereof may be, for example, 8 bits.

For example, if the start value and the end value of the attribute number are supplied from the L-R calculation device 202, then the header describing unit 194 produces a NORM header, sets the attribute extension flag X to the value "1" and sets the value of the attribute type to "0." Further, the header describing unit 194 describes the start value of the attribute number supplied thereto from the L-R calculation device 202 into the FROM and describes the end value of the attribute number supplied thereto from the L-R calculation device 202 into the TO.

Referring back to FIG. 10, the header describing unit 194 supplies the produced NORM header to the network packet production section 124 as indicated by an arrow mark 136.

Where the code stream is of the L-R type, processing is carried out in such a manner as described above.

[R-L Type]

Figure 18:
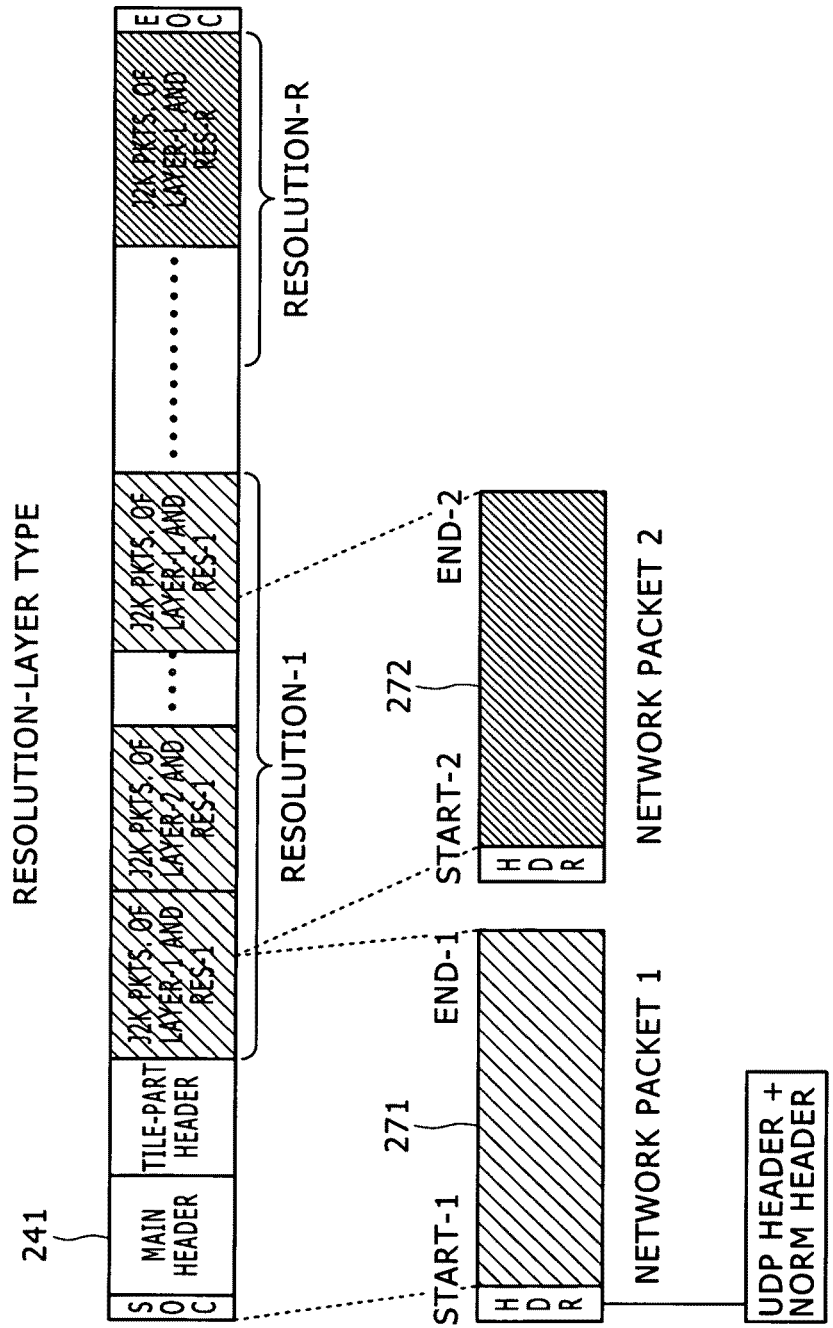
FIG. 18 is a diagrammatic view illustrating an example of a manner of production of a network packet of the R-L type.

Now, processing where a code stream is of the L-R type is described. FIG. 18 illustrates an example of a manner of production of a network packet of the R-L type.

It is assumed that the code stream dividing section 122 divides a code stream 241 of the R-L type to produce a divisional code stream 271 and another divisional code stream 272.

The divisional code stream 271 makes the Body, which is a body data part, of a first network packet, that is, Network Packet 1. The divisional code stream 272 makes the Body, which is a body data part, of a second network packet, that is, Network Packet 2.

Although naturally third and succeeding network packets are produced, they are omitted here for the convenience of description.

The address extraction unit 191 of the NORM header production section 123 determines the top address Start-1 and the end address End-1 of the divisional code stream 271. Further, the address extraction unit 191 determines the start address Start-2 and the end address End-2 of the divisional code stream 272.

At this time, the start address Start-1 of the divisional code stream 271 is equal to the start address of the SOC marker of the original code stream 241, and the end address End-1 of the divisional code stream 271 is equal to an intermediate address of the packet of the layer 1 and the resolution 1, that is, Layer-1 and Res-1.

Similarly, the start address Start-2 of the divisional code stream 272 is equal to the address immediately following the end address End-1 of the divisional code stream 271, and the end address End-2 of the divisional code stream 272 is equal to an intermediate address of the packet of the layer L and the resolution 1, that is, Layer-L and Res-1.

If the resolution and layer calculation unit 192 confirms from the progression order information that the code stream is of the R-L type, then it determines, based on the structure, the values of the variables (R_f, R_t) and (L_f, L_t) regarding of each of the divisional code streams as described hereinabove.

For example, in the case of the divisional code stream 271 of the Network Packet 1 in the example of FIG. 18, the variables (R_f, R_t) and (L_f, L_t) described above come to have the following values:

$$(R\_f, R\_t) = (0,1)$$

$$(L\_f, L\_t) = (0,1)$$

Meanwhile, in the case of the divisional code stream 272 of the Network Packet 2, the variables (R_f, R_t) and (L_f, L_t) described above come to have the following values:

$$(R\_f, R\_t) = (1,1)$$

$$(L\_f, L\_t) = (1,L)$$

Referring back to FIG. 10, after the resolution and layer calculation unit 192 calculates the values of the variables (R_f, R_t) and (L_f, L_t) described hereinabove, it supplies the values to the attribute number calculation unit 193 as indicated by an arrow mark 212. The attribute number calculation unit 193 calculates an attribute number for each of the start and the end of each divisional code stream or each network packet.

The type discrimination device 201 supplies, where the type of the code stream is the R-L type, the values of the variables (R_f, R_t) and (L_f, L_t) supplied thereto from the resolution and layer calculation unit 192 to the R-L calculation device 203 as indicated by an arrow mark 222.

The type discrimination device 201 determines, for each of the divisional code streams, attribute numbers of the start and the end, that is, the start value and the end value, from the values of the variables (R_f, R_t) and (L_f, L_t) using a calculation expression for the R-L given as an expression (2) given below:

$$\text{Attribute Number} = (\text{Resolution-number}) \times (\text{total layer number}) + (\text{Layer-number} + 1) \quad (2)$$

It is to be noted that the total layer number is the total number of layers.

For example, if the total layer number L is set to L=5 in the example of FIG. 18, then the start value and the end value of the attribute number of the divisional code stream 251 become such as given below:

$$\text{Start value} = R\_f \times (L) + L\_f + 1 = 0 \times 5 + 0 + 1 = 1$$

$$\text{End value} = R\_t \times (L) + L\_t + 1 = 1 \times 5 + 1 + 1 = 7$$

Meanwhile, the start value and the end value of the attribute number of the divisional code stream 272 become such as given below:

$$\text{Start value} = R\_f \times (L) + L\_f + 1 = 1 \times 5 + 1 + 1 = 7$$

$$\text{End value} = R\_t \times (L) + L\_t + 1 = 1 \times 5 + 5 + 1 = 11$$

The R-L calculation device 203 determines the start value and the end value of the attribute number with regard to all divisional code streams the values of the variables (R_f, R_t) and (L_f, L_t) of which are supplied thereto as described above. The R-L calculation device 203 supplies the determined start values and end values of the attribute numbers to the header describing unit 194 as indicated by an arrow mark 213.

The header describing unit 194 produces a NORM header for each of the divisional code streams of the start values and the end values of the attribute numbers supplied thereto from the R-L calculation device 203 and describes the start value and the end value of the attribute number into the extended parameter region of the NORM header.

This method is basically same as that in the case of the L-R type described hereinabove. For example, if the start value and the end value of the attribute number are supplied from the R-L calculation device 203, then the header describing unit 194 produces a NORM header, sets the attribute extension flag X to the value "1" and sets the value of the attribute type to "1." Further, the header describing unit 194 describes the start value of the attribute number supplied thereto from the R-L calculation device 203 into the FROM and describes the end value of the attribute number supplied thereto from the R-L calculation device 203 into the TO.

Referring back to FIG. 10, the header describing unit 194 supplies the produced NORM header to the network packet production section 124 as indicated by an arrow mark 136.

[Flow of Processing]

An example of a flow of such processes as described above is described. First, an example of a flow of a distribution data production process which is executed by the distribution data production apparatus 101 is described with reference to FIG. 19.

For example, if an instruction for execution of the process is issued by the user or if image data are supplied from the outside or are produced, then the distribution data production apparatus 101 starts the distribution data production process to produce data for distribution from the image data or content data.

After the distribution data production process is started, the JPEG 2000 encoder 121 codes the image data for production of distribution data using the JPEG 2000 method at step S101.

At step S102, the code stream dividing section 122 divides the code stream obtained by the coding for each of predetermined data lengths to produce divisional code streams.

At step S103, the NORM header production section 123 produces an NORM header for each of the divisional code streams and describes a start value and an end value of an attribute number into the extended parameter region.

At step S104, the network packet production section 124 converts each divisional code stream into a packet using the produced NORM header to produce a network packet. At step S105, the network packet production section 124 outputs the produced network packets.

The network packets outputted from the distribution data production apparatus 101 are supplied to and stored into the content server 102.

Figure 19:
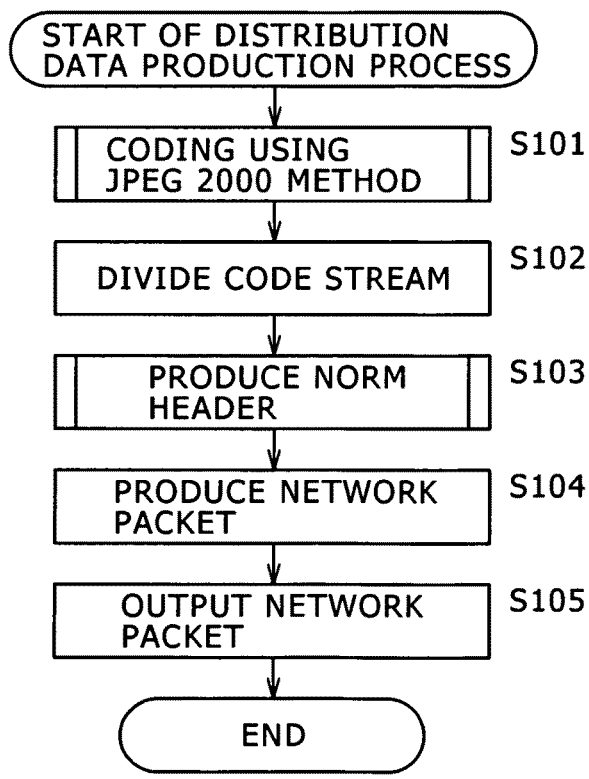
FIG. 19 is a flow chart illustrating an example of a flow of a distribution data production process.
Figure 20:
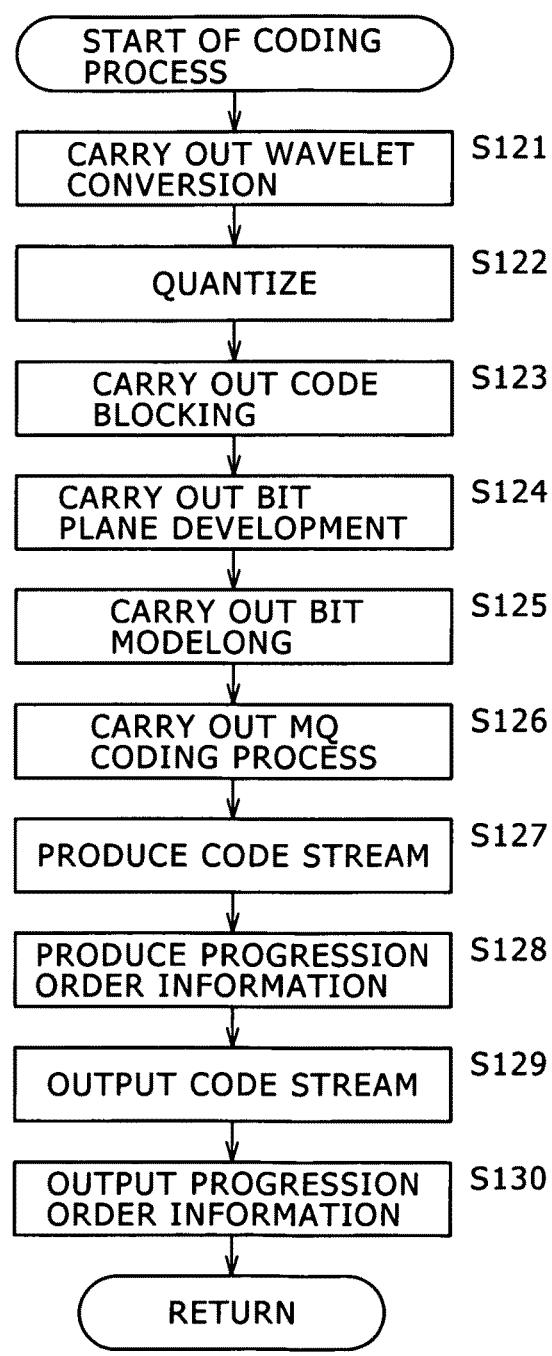
FIG. 20 is a flow chart illustrating an example of a flow of a coding process.

Now, an example of a detailed flow of the coding process which is executed at step S101 in FIG. 19 is described with reference to FIG. 20.

After the coding process is started, the wavelet conversion unit 151 carries out wavelet conversion of image data by one picture at step S121. At step S122, the quantization unit 152 quantizes the coefficient data produced at step S121. It is to be noted that, in the case of reversible coding, the processing at step S122 is omitted.

At step S123, the code blocking unit 153 carries out code blocking of the coefficient data. At step S124, the bit plane development unit 154 carries out bit plane development of the coefficient data of each code block.

At step S125, the bit modeling device 161 of the EBCOT 155 executes a bit modeling process. At step S126, the MQ coding device 162 of the EBCOT 155 carries out an MQ coding process.

At step S127, the code stream production unit 156 aligns the produced encoded data in the EBCOT 155 to produce a code stream. Further, at step S128, the code stream production unit 156 produces progression order information regarding the produced code stream.

At step S129, the code stream production unit 156 outputs the code stream. Further, at step S130, the code stream production unit 156 outputs the progression order information.

If the processing at step S130 is ended, then the coding process is ended, and the processing returns to step S101 in FIG. 19 and then the processes after step S102 are executed.

Next, an example of a detailed flow of the NORM header production process which is executed at step S103 of FIG. 19 is described with reference to FIG. 21.

After the NORM header production process is started, the address extraction unit 191 extracts, at step S151, a start address and an end address of each of the divisional code streams.

At step S152, the resolution and layer calculation unit 192 calculates resolution and layers, which are image characteristic amounts, at the start and the end of each divisional code stream from the start address and the end address based on the progression order information.

At step S153, the attribute number calculation unit 193 calculates a start value and an end value of the attribute number of each divisional code stream from the resolution and the layers at the start and the end of the divisional code streams.

At step S154, the header description section 194 produces a NORM header regarding each of the divisional code streams and describes the start value and the end value of the attribute number into the produced NORM header.

If the processing at step S154 is ended, then the processing returns to step S103 in FIG. 19 to execute the processes at and the processes at the steps beginning with step S104.

Figure 21:
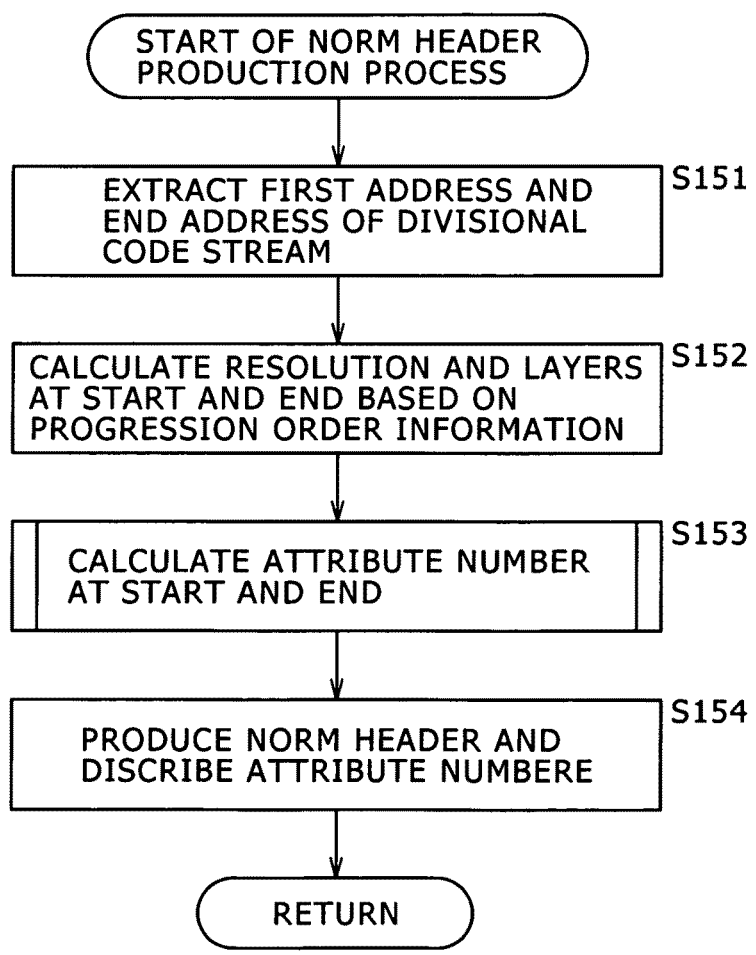
FIG. 21 is a flow chart illustrating an example of a flow of a NORM header production process.
Figure 22:
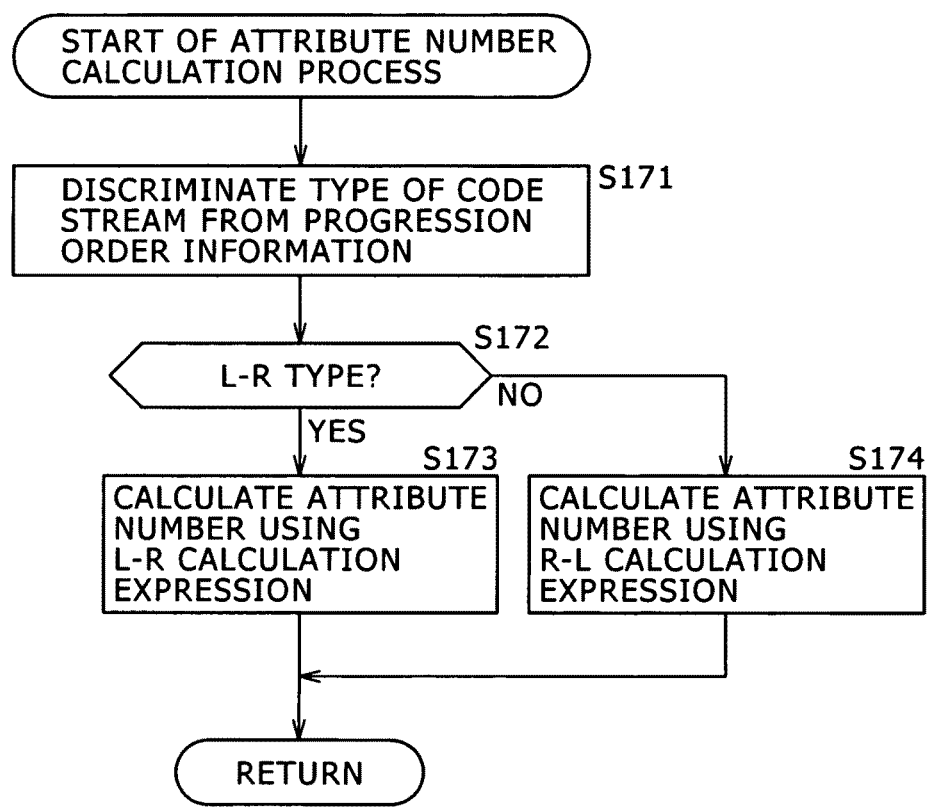
FIG. 22 is a flow chart illustrating an example of a flow of an attribute number calculation process.

Now, an example of a detailed flow of the attribute number calculation process which is executed at step S153 of FIG. 21 is described with reference to FIG. 22.

After the attribute number calculation process is started, at step S171, the type discrimination device 201 discriminates the type of the code stream from the progression order information.

If it is discriminated that the type of the code stream is the L-R type, then the type discrimination device 201 advances the processing from step S172 to step S173. At step S173, the L-R calculation device 202 calculates an attribute number from the resolution number and the layer number using an L-R calculation expression such as the expression (1).

On the other hand, if it is discriminated that the type of the code stream is the R-L type, then the type discrimination device 201 advances the processing from step S172 to step S174. At step S174, the R-L calculation device 203 calculates an attribute number from the resolution number and the layer number using an R-L calculation expression such as the expression (2).

After the attribute number is calculated, the attribute number calculation process is ended, and the processing returns to step S153 in FIG. 21 to execute processes at the steps beginning with step S154.

As described above, the NORM header production section 123 describes, regarding each of the start and the end of a network packet, that is, a divisional code stream, the attribute number and so forth as information indicative of resolution of a layer, that is, image characteristic amounts, into the extended parameter region of the NORM header. Although details are hereinafter described, the distribution server 103 which processes or distributes network packets can readily acquire necessary data in response to desired image characteristic amounts only by carrying out suitable selection based on the information of the NORM header.

In particular, the distribution data production apparatus 101 adds information regarding the attribute number, for example, information regarding image characteristic amounts such as resolution, a layer and so forth to a network packet. Consequently, the distribution data production apparatus 101 can produce a network packet from which the distribution server 103 can easily acquire necessary data in response to a desired image characteristic amount such as resolution or picture quality.

It is to be noted that the information regarding the attribute number, that is, the information regarding an image characteristic amount, may be added to or described at an arbitrary position other than the extended parameter region described hereinabove or at a position other than the NORM header.

However, if, as a region to which an attribute number or the like is to be added, the extended parameter region of an existing NORM header which is not heretofore utilized, increase of an unnecessary data amount can be suppressed. Further, an attribute number or the like can be added while the conformity with the conventional standard is maintained. In other words, even a apparatus of the past which cannot process the information regarding the attribute number can process any other part of the network packet in a manner of the past.

Further, since the resolution and layer calculation unit 192 grasps the structure of a code stream based on the progression order information, it can determine a resolution number and a layer number correctly irrespective of the type of the code stream.

Further, since the attribute number calculation unit 193 discriminates the type of the code stream and determines the attribute number using a calculation expression suitable for the type, it can determine the attribute number correctly irrespective of the type of the code stream.

Furthermore, since the bit plane development unit 154 describes an attribute type representative of the type of the code stream into the NORM header, the distribution server 103 which processes or distributes a network packet can grasp the type of the code stream readily based on the information of the NORM header. In other words, the distribution server 103 can carry out appropriate processing readily irrespective of the type of the code stream.

It is to be noted that, while it is described above that the NORM header production section 123 describes an attribute number into the NORM header, image characteristic amounts such as a resolution number and a layer number may be described in place of the attribute number. However, the attribute number is a single value and exhibits a data amount smaller than a resolution number and a layer number. In other words, where an attribute number is described into the NORM header, the data amount of a network packet can be reduced in comparison with an alternative case in which both of the resolution number and the layer number are described.

Further, as a type of a code stream, a type other than the L-R type and the R-L type described hereinabove may be provided. For example, as a variable regarding the progression, an image characteristic amount other than the resolution and the layer may be applied. Furthermore, the number of types to be applied is selected arbitrarily and may be three or more or otherwise may be one.

Whatever types are set, the structure of a code stream is indicated in regard to all types to be applied in the progression order information. Accordingly, the resolution and layer calculation unit 192 can grasp the structure of code streams of all types to be applied by referring to the progression order information. It is to be noted that, where an image characteristic amount other than the resolution and the layer is applied as a variable regarding the progression, the resolution and layer calculation unit 192 determines an identification number of the image characteristic mount similarly as in the case of the resolution number or the layer number.

Further, the attribute number calculation unit 193 includes calculation devices configured to calculate, regarding all types to be applied, an attribute number using calculation expressions for exclusive use for the individual types. The type discrimination device 201 supplies information of the resolution number, layer number and so forth of each divisional code stream to the calculation device corresponding to the discriminated type.

Further, for the attribute type to be described by the header describing unit 194, different values for all types to be applied are prepared in advance.

[Example of the Configuration of the Distribution Server]

Now, apparatus which utilize network packets produced in such a manner as described above are described. As described hereinabove, the distribution server 103 acquires a network packet from the content server 102 and distributes the network packet to the terminal apparatus 104 and/or the terminal apparatus 105.

At this time, the distribution server 103 selects only network packets of necessary data in response to a desired image characteristic amount based on the attribute number included in the NORM header of each network packet.

Figure 23:
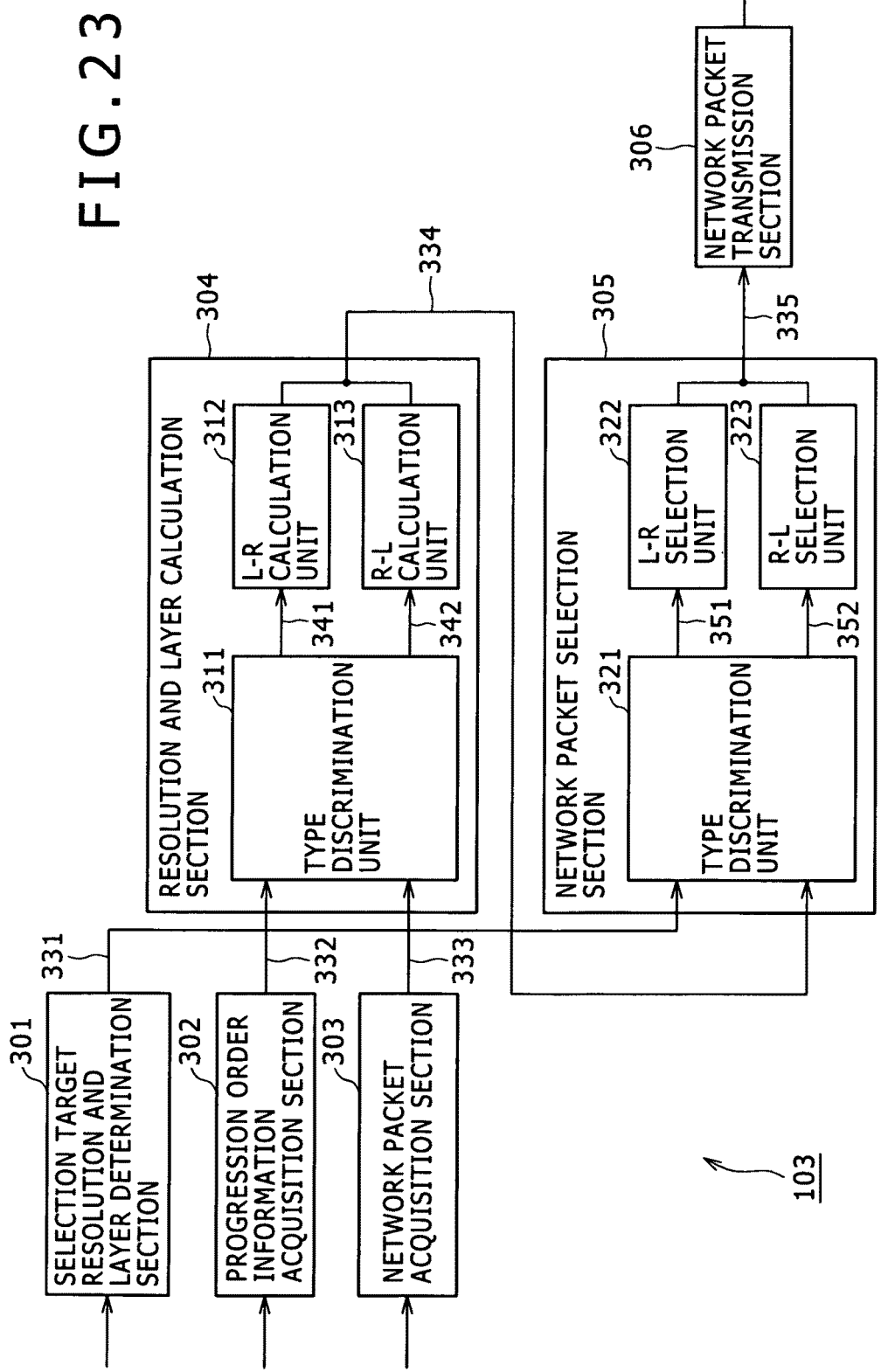
FIG. 23 is a block diagram showing an example of principal components of a distribution server shown in FIG. 1.

FIG. 23 shows an example of principal components of the distribution server 103 shown in FIG. 1.

Referring to FIG. 23, the distribution server 103 shown includes a selection target resolution and layer determination section 301, a progression order information acquisition section 302, a network packet acquisition section 303, a resolution and layer calculation section 304, a network packet selection section 305 and a network packet transmission section 306.

The selection target resolution and layer determination section 301 determines resolution and a layer of an image to be distributed, that is, of a target of selection, that is, determines image characteristic amounts, based on various kinds of information.

For example, if an image to be distributed by the selection target resolution and layer determination section 301 has resolution or picture quality unnecessarily high with respect to a performance or a situation of the terminal apparatus 104 which is a distribution destination, then there is the possibility that some fault may occur in data transmission or image display. On the contrary, if an image to be distributed by the selection target resolution and layer determination section 301 has resolution or picture quality unnecessarily low with respect to a performance of the terminal apparatus 104 of a distribution object, then image display which makes the best use of a performance of the terminal apparatus can not be implemented. In other words, only it is possible to display an image of an unnecessarily low resolution and unnecessarily low picture quality.

Similarly, the data transmission amount is not preferable in both of a case in which it is excessively great and another case in which it is excessively small with respect to the bandwidth which can be used by a network to be used as a transmission line for a network packet. Further, it is preferable for the data transmission amount to be appropriate with respect to the capacity or the situation of the distribution server 103 itself. Furthermore, where a billing process is to be carried out for distribution of a content, the resolution or the picture quality or layer of an image to be distributed may be controlled in response to the amount of payment for the charge by a terminal apparatus from which a request for distribution is issued.

In this manner, the selection target resolution and layer determination section 301 determines resolution and a layer, which are image characteristic amounts, of a target of selection based on arbitrary conditions, for example, the performance or the state of an apparatus of the distribution destination such as the reception processing capacity, image processing capacity, buffer capacity or resolution of the monitor, a usable bandwidth of a network to be used as a transmission line for a network packet, the performance or the state of the distribution server 103 itself, the amount of payment of the charge for the distribution or an instruction of the user.

The selection target resolution and layer determination section 301 notifies the network packet selection section 305 of information of the determined resolution and layer as indicated by an arrow mark.

The progression order information acquisition section 302 acquires the progression order information of the code stream corresponding to a network packet to be acquired from the content server 102. The progression order information acquisition section 302 supplies the acquired progression order information to the resolution and layer calculation section 304 as indicated by an arrow mark 332.

The network packet acquisition section 303 acquires a network packet of the content to be distributed from the content server 102 and supplies the content network packet to the resolution and layer calculation section 304 as indicated by an arrow mark 333.

The resolution and layer calculation section 304 refers to the NORM header of each network packet supplied thereto from the network packet acquisition section 303 and determines a resolution number and a layer number, which are image characteristic amounts, at a start and an end of each network packet from the start value and the end value of the attribute number.

The resolution and layer calculation section 304 includes a type discrimination unit 311, an L-R calculation unit 312 and an R-L calculation unit 313.

The type discrimination unit 311 discriminates the type of the code stream corresponding to the network packet supplied from the network packet acquisition section 303 as indicated by an arrow mark 333 based on the progression order information supplied from the progression order information acquisition section 302 as indicated by an arrow mark 332.

If the type of the code stream is the L-R type, then the type discrimination unit 311 supplies the network packet supplied thereto from the network packet acquisition section 303 to the L-R calculation unit 312 as indicated by an arrow mark 341.

The L-R calculation unit 312 uses such a calculation expression for the L-R as given hereinabove as the expression (1) to determine, for each divisional code stream, the start value and end value (R_f, R_t) of the resolution number and the start value and end value (L_f, L_t) of the layer number from the start value and the end value of the attribute number.

It is to be noted that, while two variables, that is, R_f and R_t or L_f and L_t, are determined from one value, they are all natural numbers and besides the resolution numbers R_f and R_t are smaller than the Resolution level number R, that is, Res-R. Accordingly, the start value and end value (R_f, R_t) of the resolution number and the start value and end value (L_f, L_t) of the layer number are decided uniquely from the start value and the end value of the attribute number.

More particularly, for example, at the end of a divisional code stream, the L-R calculation unit 312 divides a value obtained by subtracting 1 from the value of the attribute number by the resolution level number R, that is, by Res-R, and sets the quotient as a layer number L_t and sets the remainder as a resolution number R_t. It is to be noted, however, that the remainder must have any other value than zero. In other words, in this instance, the L-R calculation unit 312 sets a value obtained by subtracting 1 from the quotient as the layer number L_t and sets the remainder in this instance as the resolution number R_t. Thus, the value of the resolution number R_t in this instance is R.

It is to be noted that, at the start, both of the resolution number R_f and the layer number L_f of the first network packet, that is, of the Network Packet 1, are zero. In the case of the second or succeeding network packet, the resolution number R_f and the layer number L_f at the start can be determined similarly as in the case of the resolution number R_t and the layer number L_t of the end described above.

The L-R calculation unit 312 supplies the start value and the end value (R_f, R_t) of the resolution number and the start value and the end value (L_f, L_t) of the layer number calculated as described above to the network packet selection section 305 together with the network packet as indicated by an arrow mark 334.

On the other hand, if the type of the code stream is the R-L type, then the type discrimination unit 311 supplies network packets supplied thereto from the network packet acquisition section 303 to the R-L calculation unit 313 as indicated by an arrow mark 342.

The R-L calculation unit 313 uses such a calculation expression for the R-L as given hereinabove as the expression (2) to determine, for each divisional code stream, the start value and end value (R_f, R_t) of the resolution number and the start value and end value (L_f, L_t) of the layer number from the start value and the end value of the attribute number.

Also in this instance, the start value and end value (R_f, R_t) of the resolution number and the start value and end value (L_f, L_t) of the layer number are decided uniquely from the start value and the end value of the attribute number similarly as in the case of the L-R type.

More particularly, for example, at the end of a divisional code stream, the R-L calculation unit 313 divides a value obtained by subtracting 1 from the value of the attribute number by the total Layer number L, and sets the quotient as a resolution number R_t and sets the remainder as a layer number L_t. It is to be noted, however, that the remainder must have any other value than zero. In other words, in this instance, the R-L calculation unit 313 sets a value obtained by subtracting 1 from the quotient as the resolution number R_t and sets the remainder in this instance as the layer number L_t. Thus, the value of the layer number L_t in this instance is L.

It is to be noted that, at the start, both of the resolution number R_f and the layer number L_f of the first network packet, that is, of the Network Packet 1, are zero. In the case of the second or succeeding network packet, the resolution number R_f and the layer number L_f at the start can be determined similarly as in the case of the resolution number R_t and the layer number L_t at the end described above.

The R-L calculation unit 313 supplies the start value and the end value (R_f, R_t) of the resolution number and the start value and the end value (L_f, L_t) of the layer number calculated as described above to the network packet selection section 305 together with the network packet as indicated by an arrow mark 334.

The network packet selection section 305 carries out selection of network packets based on the designation of the resolutions and the layers, which are image characteristic amounts, supplied thereto from the selection target resolution and layer determination section 301 to select those network packets which are necessary to obtain an image of the designated resolution and layer.

In order to obtain an image of the resolution designated by the selection target resolution and layer determination section 301, all coded data or packets of resolution numbers lower than the resolution are required. Similarly, in order to obtain an image of a layer or picture quality designated by the selection target resolution and layer determination section 301, all coded data or packets of layer numbers lower than that of the layer are required.

In short, in order to obtain an image of resolution and a layer or picture quality designated by the selection target resolution and layer determination section 301, all of coded data or packets of resolution numbers lower than the designated resolution and coded data or packets of layer numbers lower than the designated layer number are required.

Accordingly, the network packet selection section 305 selects all of those network packets which include such coded data or packets as just described. In other words, the network packet selection section 305 selects those network packets which include image data in the form of coded data corresponding to images of the resolution and the layer designated by the selection target resolution and layer determination section 301.

As illustrated in FIGS. 16 and 18, coded data of a code stream are packetized for each of resolutions and layers of images and lined up in a predetermined order. Accordingly, the network packet selection section 305 may select network packets whose Body is a divisional code stream including packets of resolution and a layer corresponding to the designation by the selection target resolution and layer determination section 301.

Whether or not a network packet includes a packet of a pertaining resolution and a pertaining layer can be determined from the resolution number and the layer number at the start and the end of the divisional code stream.

However, the structure of a code stream, that is, the line of packets, differs depending upon the type as described hereinabove with reference to FIGS. 16 and 18.

Accordingly, the network packet selection section 305 carries out selection of a network packet using a discriminant corresponding to the type of the code stream.

The network packet selection section 305 includes a type discrimination unit 321, an L-R selection unit 322 and an R-L selection unit 323.

The type discrimination unit 321 discriminates the type of the code stream corresponding to the network packet based on the progression order information.

If the type of the code stream is the L-R type, then the network packets supplied from the resolution and layer calculation section 304 are supplied to the L-R selection unit 322 as indicated by an arrow mark 351.

The L-R selection unit 322 uses a discriminant for the R-L prepared for the L-R type to carry out selection of network packets. This L-R discriminant corresponds to the structure of the L-R type. In particular, the L-R selection unit 322 can use this L-R discriminant to correctly specify, from the resolution number and the layer number at the start and the end of the network packet produced from the code stream of the L-R type, whether or not the network packet includes coded data or a packet necessary to obtain an image of the resolution and the layer determined by the selection target resolution and layer determination section 301.

The L-R selection unit 322 selects those network packets which satisfy the condition in this manner, and supplies the extracted network packets to the network packet transmission section 306 as indicated by an arrow mark 335.

On the other hand, if the type of the code stream is the R-L type, then the type discrimination unit 321 supplies the network packets supplied from the resolution and layer calculation section 304 to the R-L selection unit 323 as indicated by an arrow mark 352.

The R-L selection unit 323 uses a discriminant for the R-L prepared for the R-L type to carry out selection of network packets. This R-L discriminant corresponds to the structure of the R-L type. In particular, the R-L selection unit 323 can use this R-L discriminant to correctly specify, from the resolution number and the layer number at the start and the end of the network packet produced from the code stream of the R-L type, whether or not the network packet includes coded data or a packet necessary to obtain an image of the resolution and the layer determined by the selection target resolution and layer determination section 301.

The R-L selection unit 323 selects those network packets which satisfy the condition in this manner, and supplies the extracted network packets to the network packet transmission section 306 as indicated by an arrow mark 335.

The network packet transmission section 306 transmits the network packets selected by the network packet selection section 305 to the terminal apparatus 104 or the terminal apparatus 105 which becomes a distribution destination.

[Flow of Processing]

An example of a flow of such processes as described above is described. First, an example of a flow of a network packet distribution process executed by the distribution server 103 is described.

For example, if distribution of a network packet is determined based on a request from the terminal apparatus 104 or the terminal apparatus 105 or on an instruction of the user or the like, then the distribution server 103 starts a network packet distribution process.

After the network packet distribution process is started, the selection target resolution and layer determination section 301 determines resolution and a layer of a selection target at step S301.

At step S302, the progression order information acquisition section 302 acquires progression order information of a desired content from the content server 102.

At step S303, the network packet acquisition section 303 acquires a network packet of the desired content from the content server 102.

At step S304, the resolution and layer calculation section 304 calculates the resolution and the layer at the start and the end of the divisional code streams.

At step S305, the network packet selection section 305 selects the network packet based on the resolution and the layer of the selection target.

At step S306, the network packet transmission section 306 transmits the selected network packet.

At step S307, the network packet acquisition section 303 discriminates whether or not all network packets are processed. If it is discriminated that a network packet which is not processed as yet exists in the desired content, then the processing returns to step S303 to repeat the processes at the steps beginning with step S303.

On the other hand, if it is discriminated at step S307 that the network packets of the desired content are all processed, then the network packet distribution process is ended.

Figure 24:
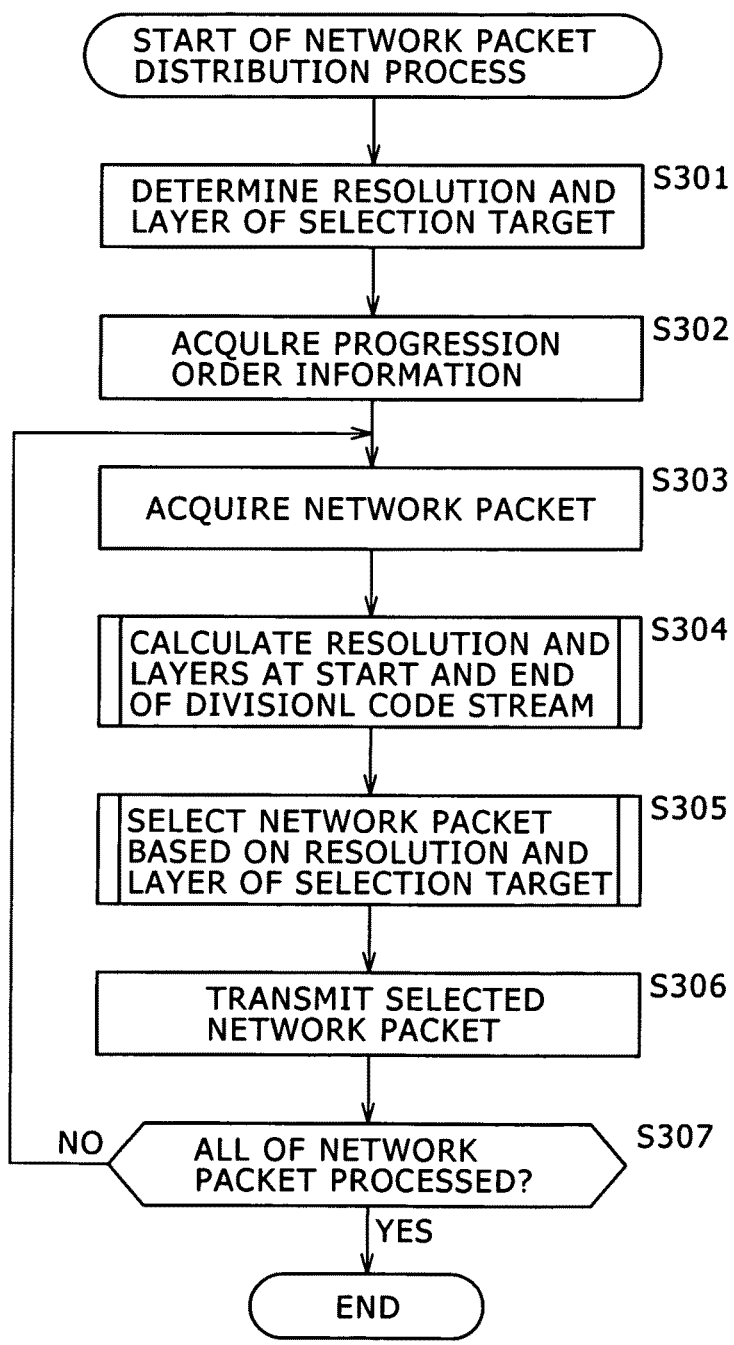
FIG. 24 is a flow chart illustrating an example of a flow of a network packet distribution process.
Figure 25:
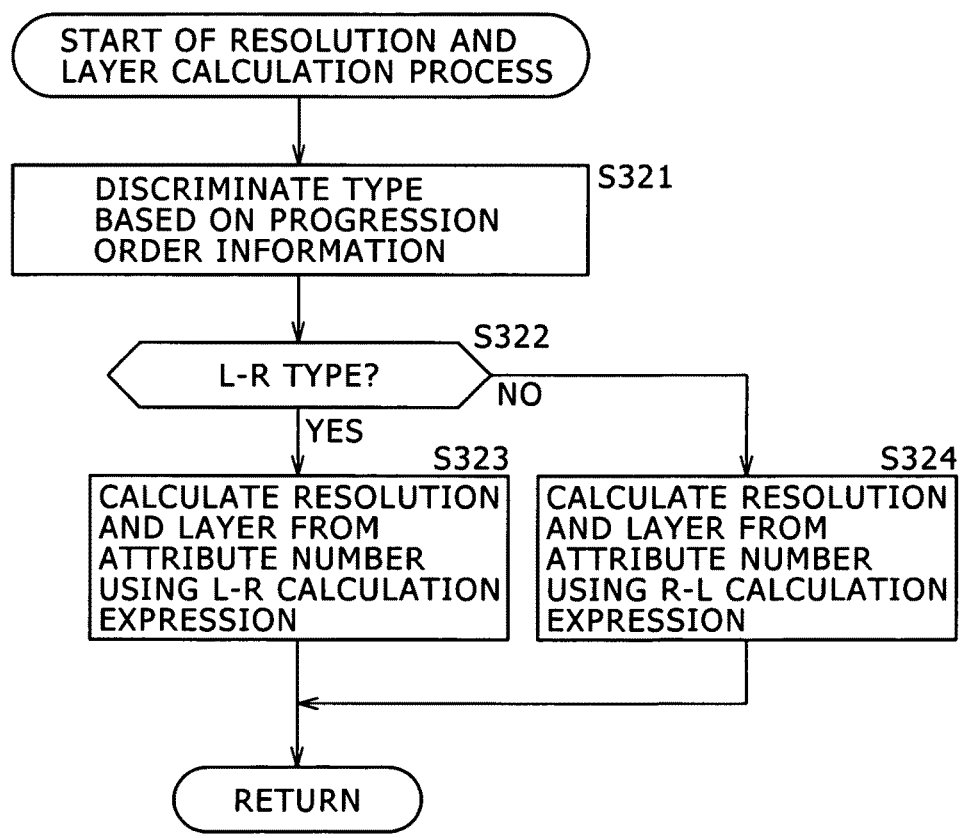
FIG. 25 is a flow chart illustrating an example of a flow of a resolution and layer calculation process.

Now, an example of a detailed flow of the resolution and layer calculation process executed at step S304 of FIG. 24 is described with reference to a flow chart of FIG. 25.

After the resolution and layer calculation process is started, the type discrimination unit 311 discriminates the type of the code stream based on progression order information at step S321.

If it is discriminated that the type of the code stream is the L-R type, then the type discrimination unit 311 advances the processing from step S322 to step S323. At step S323, the L-R calculation unit 312 uses the L-R calculation expression to determine a resolution number and a layer number from the attribute number.

On the other hand, if it is discriminated that the type of the code stream is the R-L type, then the type discrimination unit 311 advances the processing from step S322 to step S324. At step S324, the R-L calculation unit 313 uses the R-L calculation expression to determine a resolution number and a layer number from the attribute number.

After a resolution number and a layer number are determined, the resolution and layer calculation process is ended, and the processing returns to step S304 of FIG. 24 so that the processes at the steps beginning with step S305 are executed.

Figure 26:
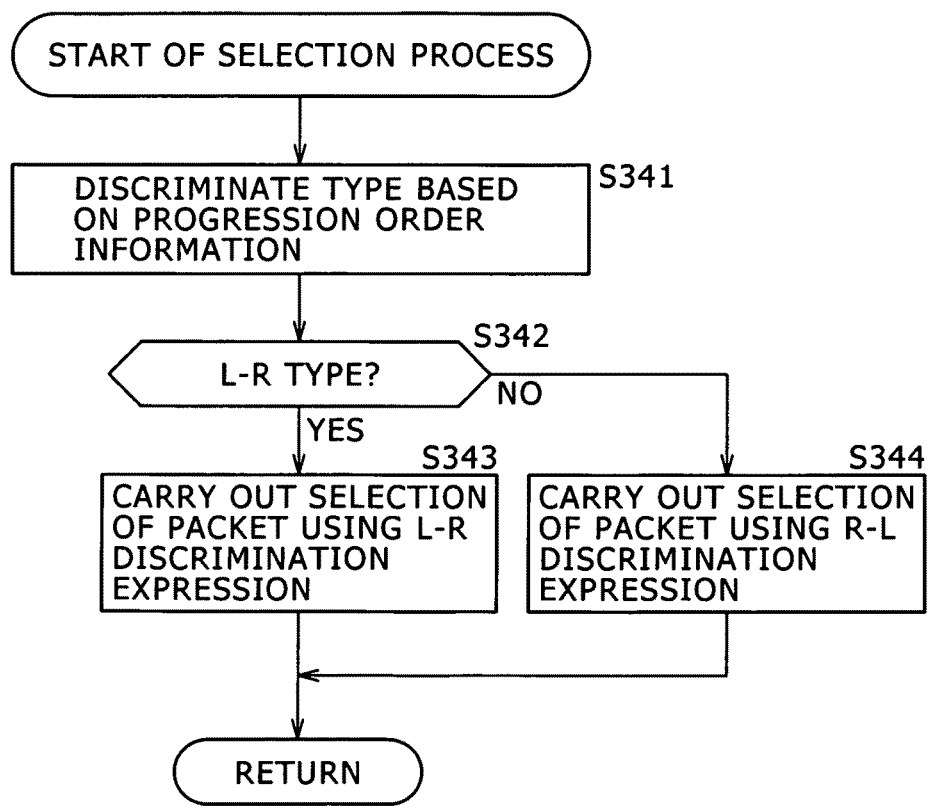
FIG. 26 is a flow chart illustrating an example of a selection process.

Now, an example of a detailed flow of the selection process executed at step S305 of FIG. 24 is described with reference to a flow chart of FIG. 26.

After the selection process is started, the type discrimination unit 321 discriminates, at step S341, the type of the code stream based on the progression order information.

If it is discriminated that the type of the code stream is the L-R type, then the type discrimination unit 321 advances the processing from step S342 to step S343. At step S343, the L-R selection unit 322 uses the L-R discrimination expression to carry out selection of the packet.

On the other hand, if it is discriminated that the type of the code stream is the R-L type, then the type discrimination unit 321 advances the processing from step S342 to step S344. At step S344, the R-L selection unit 323 carries out selection of the packet using the R-L discrimination expression.

After the packet is selected, the selection process is ended, and the processing returns to step S305 of FIG. 24 to execute the processes at the steps beginning with step S306.

In this manner, the resolution and layer calculation section 304 determines, from the start value and the end value of the attribute number described in the extended parameter region of the NORM header of each network packet, the resolution number and the wire number at the start and the end of the divisional code stream included in the network packet.

Then, the network packet selection section 305 selects and extracts those network packets which are necessary to acquire an image of a desired resolution and a desired layer or desired picture quality based on the resolution number and the layer number.

Consequently, the distribution server 103 can acquire necessary data more readily in response to a desired image characteristic amount only by selecting network packets based on information of the attribute number and so forth described in the NORM header.

It is to be noted that, since the information regarding the attribute number, that is, the information regarding an information characteristic amount, is described in the NORM header of the network packets, the distribution server 103 can process the network packets by a method similar to a conventional method. In other words, the distribution server 103 can easily refer to the information regarding the attribute number to carry out processing.

Further, the resolution and layer calculation section 304 discriminates the type of the code stream based on the progression order information and uses a calculation expression suitable for the discriminated type to determine a resolution number and a layer number from the attribute number. Therefore, the resolution number and the layer number can be determined correctly irrespective of the type of the code stream.

Further, the network packet selection section 305 uses a discrimination expression suitable for the type of the code stream to carry out selection of network packets. Therefore, necessary data can be acquired correctly in response to a desired resolution or desired picture quality irrespective of the type of the code stream.

In short, since the distribution server 103 can discriminate the type of the code stream and select a suitable processing method in response to the discriminated type, it can be compatible with a plurality of types.

Naturally, the distribution server 103 can be compatible also with a type different from the L-R type and the R-L type described hereinabove. For example, to the code stream, an image characteristic amount other than the resolution and the layer may be applied as a variable regarding the progression. Further, the number of types to be applied may be selected arbitrarily and may be three or more or may be one.

Whichever type is set, the progression order information indicates the structure of the code stream regarding all tapes to be applied. Accordingly, the resolution and layer calculation section 304 and the network packet selection section 305 can refer to the progression order information to grasp the structure of the code stream of all types to be applied.

It is to be noted that, if a characteristic amount other than the resolution and the layer is applied as a variable regarding the progression, then the resolution and layer calculation section 304 determines the identification number regarding the characteristic amount similarly as in the case of the resolution number or the layer number. The selection target resolution and layer determination section 301 determines a value to be made a selection target regarding the characteristic amount, and the network packet selection section 305 carries out selection of network packets using the value of the characteristic amount as a condition similarly as in the case of the resolution and the layer.

Further, the resolution and layer calculation section 304 includes calculation units for all of the types to be applied for calculating an image characteristic amount such as a resolution number or a layer number using a calculation expression for each of the types. The type discrimination unit 311 supplies information of the attribute number and so forth of each divisional code stream to a calculation unit for the discriminated type.

Similarly, the network packet selection section 305 includes selection units for all of the types to be applied for carrying out selection of a network packet using a discriminant for exclusive use for the type. The type discrimination unit 321 supplies each network packet to a selection unit for the type discriminated.

In this manner, the content distribution system 100 can readily obtain necessary data in response to a desired characteristic amount such as resolution or picture quality.

It is to be noted that, while an example of the configuration of the content distribution system 100 is shown in FIG. 1, the number of component apparatus of the content distribution system 100 can be selected arbitrarily. Or, the content server 102 may be omitted while a network packet produced by the distribution data production apparatus 101 is supplied to the distribution server 103.

Further, the component apparatus may be further connected to an apparatus other than the connection destinations indicated by arrow marks in FIG. 1. For example, the distribution data production apparatus 101 may be connected not only to the content server 102 but also to the distribution server 103, terminal apparatus 104 and terminal apparatus 105.

Furthermore, while, in the example described above, it is a utilization method of a network packet to which an attribute number is added to transmit or distribute the network packet, the utilization method may be selected arbitrarily.

Further, while, in the foregoing description, the distribution data production apparatus 101 codes image data by the JPEG 2000 method, it is only necessary for a code stream to have a structure of the progression order, and the coding method of image data is not limited to the JPEG 2000 method.

<2. Second Embodiment>

[Personal Computer]

While the series of processes described above can be executed by hardware, it may otherwise be executed by software. In this instance, the image processing apparatus may be configured, for example, a personal computer as shown in FIG. 27.

Figure 27:
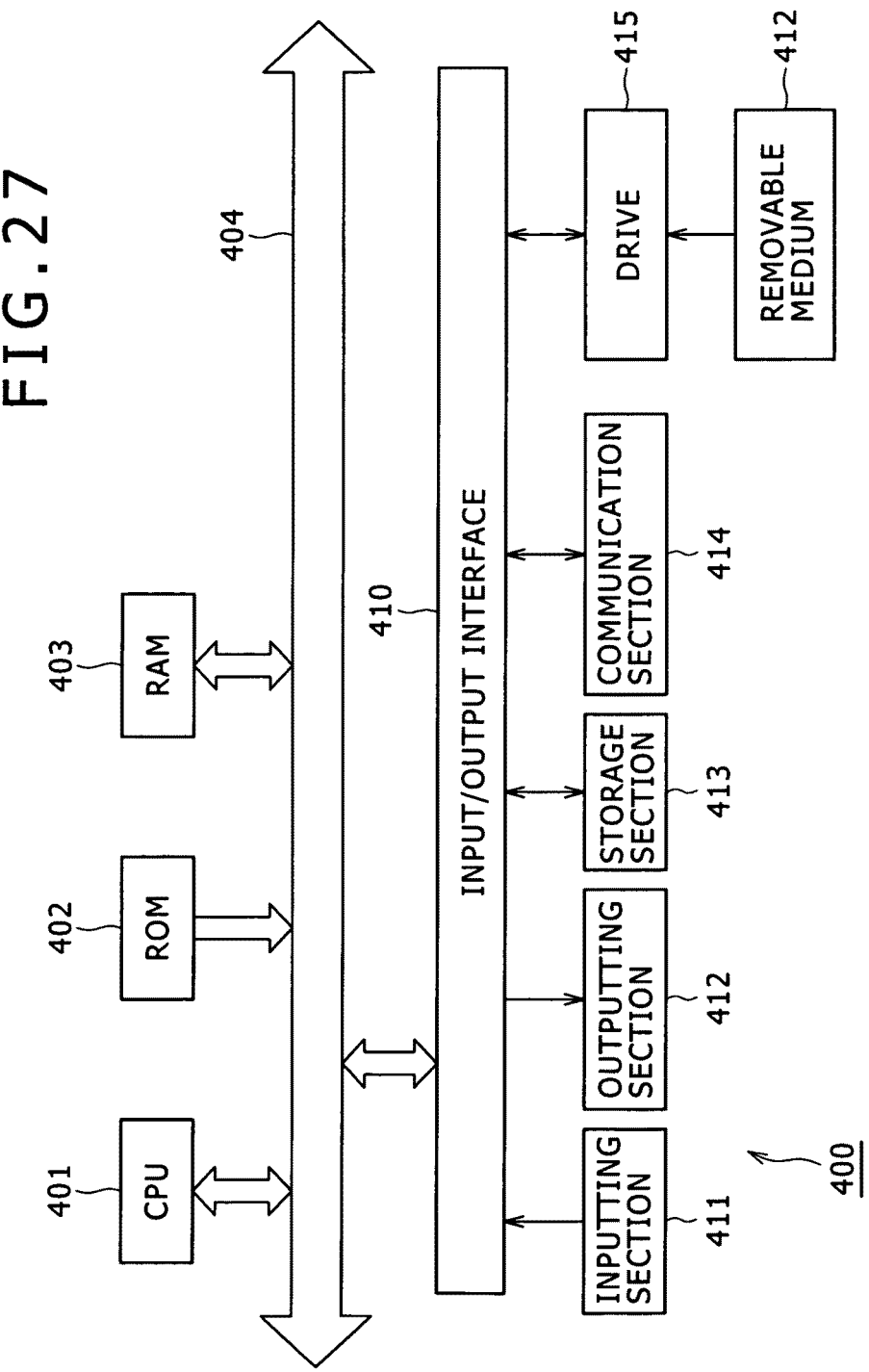
FIG. 27 is a block diagram showing an example of a configuration of a personal computer to which an embodiment of the present invention is applied.

Referring to FIG. 27, the personal computer 400 includes a CPU (central Processing Unit) 401 which executes various processes in accordance with a program stored in a ROM (Read Only Memory) 402 or a program loaded from a storage section 413 into a RAM (Random Access Memory) 403. Also data necessary for execution of various processes by the CPU 401 and so forth are suitably stored into the RAM 403.

The CPU 401, ROM 402 and RAM 403 are connected to each other by a bus 404. Also an input/output interface 410 is connected to the bus 404.

An inputting section 411 including a keyboard, a mouse and so forth and an outputting section 412 including a display unit such as a cathode ray tube (CRT) or a liquid crystal display (LCD) panel and a speaker or the like are connected to the input/output interface 410. Also the storage section 413 formed from an SSD (Solid State Drive) such as a flash memory, a hard disk drive or the like and a communication section 414 formed from an interference to a wire LAN (Local Area Network) or a wireless LAN, a modem or the like are connected to the input/output interface 410. The communication section 414 carries out a communication process through a network including the Internet.

Further, a drive 415 is connected to the input/output interface 410 as occasion demands, and a removable medium 421 such as a magnetic disk, an optical disk, a magneto-optical disk or a semiconductor memory is suitably loaded into the drive 415. A computer program read out from the removable medium 421 by the drive 415 is installed into the storage section 413 as occasion demands.

In the case where the series of processes is to be executed by software, a program which constructs the software is installed from a network or a recording medium.

The recording medium may be configured, for example, as shown in FIG. 27, a removable medium 421 such as a magnetic disk including a flexible disk, an optical disk including a CD-ROM (Compact Disc-Read Only Memory) and a DVD (Digital Versatile Disk), a magneto-optical disk including an MD (Mini-Disc), or a semiconductor memory which has the program recorded thereon or therein and is distributed in order to provide the program to a user separately from an apparatus main body, or as a ROM 402 having the program recorded therein, or a hard disk or the like included in the storage section 413.

It is to be noted that the program to be executed by the computer may be a program whose processes are carried out in a time series in accordance with the order described in the present specification or a program whose processes are carried out in parallel or at a suitable timing such as when the program is called.

Further, in the present specification, the steps which describe the program recorded in a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus or by a plurality of processing sections.

Further, a configuration described as one apparatus or one processing section in the foregoing description may be configured as a plurality of apparatus or processing sections, or conversely, a configuration described as a plurality of apparatus or processing sections in the foregoing description may be configured collectively as a single apparatus or processing section. Further, naturally some other configuration than those described hereinabove may be added to the configuration of any of the apparatus or processing sections described hereinabove. Furthermore, if the configuration or operation of the entire system is substantially same, then part of a configuration of some apparatus or processing section may be included in the configuration of some other apparatus or processing section. In short, the embodiment of the present invention is not limited to the embodiments described hereinabove but can be modified or altered in various manners without departing from the subject matter of the present invention.

The present invention can be applied, for example, to digital cinema editing apparatus, archive systems, image transmission apparatus of a broadcasting apparatus, image databases, recording systems for medical images, network servers, image transmission apparatus on the Internet, wireless transmission apparatus, secondary image distribution apparatus from a movie theater, nonlinear editing apparatus, game machines, television receiver systems, HDD recorders, authoring tools or software modules on PCs and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
header information production means for producing, regarding each of divisional code streams obtained by dividing a code stream having a structure of a progression order produced by coding image data, header information at a start and an end of the divisional code stream, the header information including a characteristic amount of an image of the image data; and
packet production means for converting each of the divisional code streams into a packet using the header information produced by said header information production means,
in which the header information produced by the header information production means conforms to a negative acknowledgment oriented reliable multicast (NORM) protocol, and
in which the header information conforming to the NORM protocol includes information indicative of (i) whether or not attribute information is provided, and if attribute information is provided the header information conforming to the NORM protocol further includes information indicative of (i) a type of a respective divisional code stream and (ii) a range or a start and end of the respective type.

2. The image processing apparatus according to claim 1, further comprising coding means for coding the image data to produce the code stream having a structure of the progression order;

said header information production means producing the header information for each of the divisional code streams obtained by dividing the code stream produced by coding the image data by said coding means.

3. The image processing apparatus according to claim 2, further comprising dividing means for dividing the code stream produced by coding the image data by means of said coding means for each of predetermined data lengths, wherein said header information production means produces the header information for each of the divisional code streams obtained by dividing the code stream by means of said dividing means.

4. The image processing apparatus according to claim 1, wherein the code stream is obtained by coding the image data using the JPEG 2000 system.

5. The image processing apparatus according to claim 4, wherein the characteristic amount includes resolution and a layer according to the JPEG 2000 system.

6. The image processing apparatus according to claim 5, wherein the progression order has a hierarchical structure of at least two hierarchies, and a variable of the upper hierarchy is the resolution and a variable of the lower hierarchy is the layer or the variable of the upper hierarchy is the layer and the variable of the lower hierarchy is the resolution.

7. The image processing apparatus according to claim 1, wherein said header information production means includes:

extraction means for extracting a start address and an end address of each of the divisional code streams;

characteristic amount calculation means for calculating a characteristic amount at a start and an end of each of the divisional code streams based on the progression order and the start address and the end address extracted by said address extraction means;

attribute calculation means for calculating the attribute information; and describing means for producing the header information and describing the attribute information calculated by said attribute calculation means into the header information.

8. The image processing apparatus according to claim 7, wherein said attribute calculation means includes:

discrimination means for discriminating the progression order; and calculation processing means for calculating the attribute information using a calculation expression for exclusive use for the progression order discriminated by said discrimination means.

9. An image processing method for an image processing apparatus, comprising the steps of:

being carried out by header information production means of the image processing apparatus, of specifying, regarding each of divisional code streams obtained by dividing a code stream having a structure of a progression order produced by coding image data, header information at a start and an end of the divisional code stream including a characteristic amount of an image of the image data; and being carried out by a packet production means of the image processing apparatus, converting each of the divisional code streams into a packet using the produced header information, in which the header information conforms to a negative acknowledgment oriented reliable multicast (NORM) protocol, and in which the header information conforming to the NORM protocol includes information indicative of (i) whether or not attribute information is provided, and if attribute information is provided the header information conforming to the NORM protocol further includes information indicative of (i) a type of a respective divisional code stream and (ii) a range or a start and end of the respective type.

10. An image processing apparatus, comprising:

a header information production section configured to produce, regarding each of divisional code streams obtained by dividing a code stream having a structure of a progression order produced by coding image data, header information at a state and an end of the divisional code stream, the header information including a characteristic amount of an image of the image data; and a packet production section configured to convert each of the divisional code stream into a packet using the header information produced by said header information production section, in which the header information produced by the header information production section conforms to a negative acknowledgment oriented reliable multicast (NORM) protocol, and in which the header information conforming to the NORM protocol includes information indicative of (i) whether or not attribute information is provided, and if attribute information is provided the header information conforming to the NORM protocol further includes information indicative of (i) a type of a respective divisional code stream and (ii) a range or a start and end of the respective type.

* * * * *